US009043763B2

(12) United States Patent
Ueno

(10) Patent No.: US 9,043,763 B2
(45) Date of Patent: May 26, 2015

(54) INFORMATION EDITING APPARATUS

(75) Inventor: Hiroshi Ueno, Osaka (JP)

(73) Assignee: PROFIELD CO., LTD., Osaka (JP)

( * ) Notice: Subject to any disclaimer, the term of this patent is extended or adjusted under 35 U.S.C. 154(b) by 2248 days.

(21) Appl. No.: 11/510,732

(22) Filed: Aug. 28, 2006

(65) Prior Publication Data

US 2007/0074159 A1 Mar. 29, 2007

(30) Foreign Application Priority Data

Aug. 30, 2005 (JP) ................................. 2005-249859
Sep. 21, 2005 (JP) ................................. 2005-273397

(51) Int. Cl.
*G06F 9/44* (2006.01)
*G06F 17/21* (2006.01)
*G06F 17/24* (2006.01)
*G06F 17/22* (2006.01)

(52) U.S. Cl.
CPC .............. *G06F 17/212* (2013.01); *G06F 17/24* (2013.01); *G06F 17/2247* (2013.01); *G06F 17/211* (2013.01)

(58) Field of Classification Search
CPC .................................................... G06F 17/212
USPC ........... 715/137, 209, 222, 229, 255; 358/1.9, 358/474
See application file for complete search history.

(56) References Cited

U.S. PATENT DOCUMENTS 3,237,046 A 2/1966 Olson
5,806,079 A * 9/1998 Rivette et al. ................. 715/210
6,389,434 B1 * 5/2002 Rivette et al. ................. 715/209
7,496,837 B1 * 2/2009 Larcheveque et al. ........ 715/237
2002/0099777 A1 * 7/2002 Gupta et al. ................... 709/206
2002/0144226 A1 * 10/2002 Nitta et al. ...................... 716/11
2003/0004836 A1 * 1/2003 Otter et al. ....................... 705/27

(Continued)

FOREIGN PATENT DOCUMENTS

EP 0173125 A2 3/1986
EP 1437663 A2 7/2004

(Continued)

OTHER PUBLICATIONS

Office Action from Japan Patent Office for application 2008-025518 dated Feb. 24, 2011.

(Continued)

*Primary Examiner* — William Bashore
*Assistant Examiner* — Nathan Shrewsbury
(74) *Attorney, Agent, or Firm* — Troutman Sanders LLP

(57) ABSTRACT

An information editing device is provided with an object storage portion 11 in which a character string object or image object is stored, a placement information storage portion 12 that stores placement area designation information that sets two or more placement areas that do not overlap each other for respectively placing the objects, and that correspond to the objects, an object output portion 13 that outputs, into placement areas that are set based on the placement area designation information, each of the objects corresponding to the respective placement areas, an input receiving portion 14 that receives a deletion instruction or a modification instruction for at least one of the objects output by the object output portion 13, and a placement modification portion 15 that, according to the deletion instruction or modification instruction, modifies the placement area of the object such that the placement area is placed without overlapping.

20 Claims, 34 Drawing Sheets

(56) References Cited

U.S. PATENT DOCUMENTS

| | | | |
|---|---|---|---|
| 2003/0237046 A1* | 12/2003 | Parker et al. | 715/513 |
| 2004/0003350 A1* | 1/2004 | Simmons et al. | 715/517 |
| 2004/0030685 A1* | 2/2004 | Helles et al. | 707/3 |
| 2004/0205624 A1* | 10/2004 | Lui et al. | 715/525 |
| 2004/0268231 A1* | 12/2004 | Tunning | 715/513 |
| 2006/0294451 A1* | 12/2006 | Kelkar et al. | 715/500 |
| 2007/0028165 A1* | 2/2007 | Cole | 715/517 |
| 2007/0050729 A1* | 3/2007 | Kawamura et al. | 715/781 |

FOREIGN PATENT DOCUMENTS

| | | |
|---|---|---|
| EP | 1437663 A2 * | 7/2004 |
| EP | 1437663 A3 | 7/2004 |
| JP | 04-305764 | 10/1992 |
| JP | 07-114548 | 5/1995 |
| JP | 11-250271 | 9/1999 |
| JP | 2002-197078 | 7/2002 |
| JP | 2003-030241 | 1/2003 |
| JP | 2003-091523 | 3/2003 |
| JP | 2003-122737 | 4/2003 |
| JP | 2004-220561 | 8/2004 |
| JP | 2005-115457 | 4/2005 |
| WO | WO-99/40510 A1 | 8/1999 |
| WO | WO 9940510 A1 * | 8/1999 |

OTHER PUBLICATIONS (Anonymous) "Conditional Formatting", Internet Citation [online] vol. 4, Aug. 3, 2004, p. 1, XP002481900.

Communication from European Patent Office for application No. 06119761.2 dated Nov. 17, 2008.

Web page "Adobe InDesign", http://www.adobe.com/products/indesign/overview.html, 18 sheets, Adobe Systems Incorporated (Aug. 2005).

Notification of Reasons for Refusal dated Aug. 6, 2007 for application No. JP 2005-273397 w/English translation.

"HTML&XHTML 5$^{th}$ Edition" p. 376-377.

"Open Source Development with CVS" p. 34-56.

* cited by examiner

```
<?xml version="1.0" encoding="Shift_JIS"?>
<product catalog  ID=001>regional select product catalog
   <product information  ID=002>
      <explanatory image  ID=003><img src="file:///C:/images/27PHAN33.JPG"/></explanatory image>
      <place of production  ID=004>Hokkaido</place of production>
      <product name  ID=005>North Sea rolled shrimp</product name>
      <product code  ID=006>356</product code>
      <product unit  ID=007>340g</product unit>
      <copy  ID=008>Fresh rolled shrimp has been delivered from the wilds of the North Sea. Freshness that can be eaten even raw.</copy>
      <price including tax  ID=009>990 yen</price including tax>
   </product information>
   <product information  ID=010>
      <explanatory image  ID=011><img src="file:///C:/images/27PHAN33.JPG"/></explanatory image>
      <place of production  ID=012>Fukuoka</place of production>
      <product name  ID=013>select seasoned Alaska Pollack ovum</product name>
      <product code  ID=014>0051</product code>
      <product unit  ID=015>300g</product unit>
      <copy  ID=016>Ultimate flavor hand-picked from the eggs of carefully selected Alaska Pollack.</copy>
      <price including tax  ID=017>1490 yen</price including tax>
   </product information>
</product catalog>
```

FIG.4

| area ID | coordinates (x, y) | size (width, height) | page | object ID |
|---|---|---|---|---|
| 1 | (30, 60) | (540, 70) | 1 | 001 |
| 2 | (30, 140) | (250, 230) | 1 | 003 |
| 3 | (300, 140) | (150, 18) | 1 | 004 |
| 4 | (300, 176) | (150, 18) | 1 | 005 |
| 5 | (300, 212) | (150, 18) | 1 | 006 |
| 6 | (300, 248) | (150, 18) | 1 | 007 |
| 7 | (300, 284) | (240, 44) | 1 | 008 |
| 8 | (300, 346) | (150, 18) | 1 | 009 |
| 9 | (30, 440) | (250, 230) | 1 | 011 |
| 10 | (300, 440) | (150, 18) | 1 | 012 |
| 11 | (300, 476) | (150, 18) | 1 | 013 |
| 12 | (300, 512) | (150, 18) | 1 | 014 |
| 13 | (300, 548) | (150, 18) | 1 | 015 |
| 14 | (300, 584) | (240, 44) | 1 | 016 |
| 15 | (300, 646) | (150, 18) | 1 | 017 |

FIG.5

| area ID | coordinates (x,y) | size (width, height) | page | object ID |
|---|---|---|---|---|
| 1 | (30, 60) | (540, 70) | 1 | 001 |
| 2 | (30, 140) | (250, 230) | 1 | 003 |
| 3 | (300, 140) | (150, 18) | 1 | 004 |
| 4 | (300, 176) | (150, 18) | 1 | 005 |
| 5 | (300, 212) | (150, 18) | 1 | 006 |
| 6 | (300, 248) | (150, 18) | 1 | 007 |
| 7 | (300, 284) | (240, 44) | 1 | 008 |
| 8 | (300, 346) | (150, 18) | 1 | 009 |
| 9 | (30, 440) | (250, 230) | 1 | 011 |
| 10 | (300, 440) | (150, 18) | 1 | 012 |
| 11 | (300, 476) | (150, 18) | 1 | 013 |
| 12 | (300, 512) | (150, 18) | 1 | 014 |
| 13 | (300, 548) | (150, 18) | 1 | 015 |
| 14 | (300, 584) | (240, 74) | 1 | 016 |
| 15 | (300, 676) | (150, 18) | 1 | 017 |

FIG.7

| area ID | coordinates (x,y) | size (width, height) | page | object ID |
|---|---|---|---|---|
| 1 | (30, 60) | (540, 70) | 1 | 001 |
| 2 | (30, 140) | (250, 230) | 1 | 003 |
| 3 | (300, 140) | (150, 18) | 1 | 004 |
| 4 | (300, 176) | (150, 18) | 1 | 005 |
| 5 | (300, 212) | (150, 18) | 1 | 006 |
| 7 | (300, 248) | (240, 44) | 1 | 008 |
| 8 | (300, 310) | (150, 18) | 1 | 009 |
| 9 | (30, 440) | (250, 230) | 1 | 011 |
| 10 | (300, 440) | (150, 18) | 1 | 012 |
| 11 | (300, 476) | (150, 18) | 1 | 013 |
| 12 | (300, 512) | (150, 18) | 1 | 014 |
| 13 | (300, 548) | (150, 18) | 1 | 015 |
| 14 | (300, 584) | (240, 74) | 1 | 016 |
| 15 | (300, 676) | (150, 18) | 1 | 017 |

FIG.9

```
<?xml version="1.0" encoding="Shift_JIS"?>
<product catalog  ID=001>regional select product catalog
   <product information  ID=002>North Sea rolled shrimp
      <explanatory image  ID=003><img src="file:///C:/images/27PHAN33.JPG" /></explanatory image>
      <place of production  ID=004>Hokkaido</place of production>
      <product code  ID=005>356</product code>
      <product unit  ID=006>340g</product unit>
      <copy  ID=007>Fresh rolled shrimp has been delivered from the wilds of the North Sea. Product limited to 200 boxes.</copy>
      <price including tax  ID=008>990 yen</price including tax>                    —141
   </product information>
   <product information  ID=009>select seasoned Alaska Pollack ovum
      <explanatory image  ID=010><img src="file:///C:/images/27PHAN33.JPG" /></explanatory image>
      <place of production  ID=011>Fukuoka</place of production>
      <product code  ID=012>0051</product code>
      <product unit  ID=013>300g</product unit>
      <copy  ID=014>Ultimate flavor hand-picked from the eggs of carefully selected Alaska Pollack.</copy>
      <price including tax  ID=015>1490 yen</price including tax>
   </product information>
</product catalog>
```

FIG.14

| area ID | coordinates (x, y) | size (width, height) | page | object ID |
|---|---|---|---|---|
| 1 | (30, 60) | (540, 70) | 1 | 001 |
| 2 | (300, 140) | (150, 18) | 1 | 002 |
| 3 | (30, 140) | (250, 230) | 1 | 003 |
| 4 | (300, 176) | (150, 18) | 1 | 004 |
| 5 | (300, 212) | (150, 18) | 1 | 005 |
| 6 | (300, 248) | (150, 18) | 1 | 006 |
| 7 | (300, 284) | (240, 44) | 1 | 007 |
| 8 | (300, 346) | (150, 18) | 1 | 008 |
| 9 | (300, 440) | (150, 18) | 1 | 009 |
| 10 | (30, 440) | (250, 230) | 1 | 010 |
| 11 | (300, 476) | (150, 18) | 1 | 011 |
| 12 | (300, 512) | (150, 18) | 1 | 012 |
| 13 | (300, 548) | (150, 18) | 1 | 013 |
| 14 | (300, 584) | (240, 44) | 1 | 014 |
| 15 | (300, 646) | (150, 18) | 1 | 015 |

FIG.15

| modification ID | keyword | attribute value |
|---|---|---|
| 01 | new product | font-style:italic; |
| 02 | limited | font-size:18pt; font-weight:bold; |

FIG.16

```
<?xml version="1.0" encoding="Shift_JIS"?>
<product catalog  ID=001>regional select product catalog
    <product information   ID=002 style="font-size:18pt;font-weight:bold;">
North Sea rolled shrimp
        <explanatory image   ID=003><img src="file:///C:/images/27PHAN33.JPG"
/></explanatory image>
        <place of production  ID=004>Hokkaido</place of production>
        <product code  ID=005>356</product code>
        <product unit   ID=006>340g</product unit>
        <copy  ID=007>Fresh rolled shrimp has been delivered from the wilds of the
North Sea.  Product limited to 200 boxes.</copy>
        <price including tax   ID=008>990 yen</price including tax>
    </product information>
    <product information   ID=009>select seasoned Alaska Pollack ovum
        <explanatory image   ID=010><img src="file:///C:/images/27PHAN33.JPG"
/></explanatory image>
        <place of production  ID=011>Fukuoka</place of production>
        <product code  ID=012>0051</product code>
        <product unit   ID=013>300g</product unit>
        <copy  ID=014>Ultimate flavor hand-picked from the eggs of carefully selected
Alaska Pollack.</copy>
        <price including tax   ID=015>1490 yen</price including tax>
    </product information>
</product catalog>
```

FIG.17

INFORMATION EDITING APPARATUS

CROSS REFERENCE TO RELATED APPLICATIONS

The present application claims priority under 35 U.S.C. §119 to Japanese Patent Application Number 2005-273397 filed Sep. 21, 2005 and Japanese Patent Application Number 2005-249859 filed Aug. 30, 2005, the entire contents of which being hereby incorporated herein by reference.

BACKGROUND OF THE INVENTION

1. Field of the Invention

The present invention relates to information editing devices and the like that edit information of a plurality of characters or images.

2. Description of Related Art

Conventionally, editing of information of characters, images or the like that are used, for example, in the publication of mainly media such as books, magazines, or catalogs, is performed using, for example, software known as desktop publishing (hereinafter, referred to as DTP) software (for example, see Non-patent Document 1), DTP devices or systems that can realize similar processing, or the like.

For example, in editing of information in this sort of DTP software or the like, work is often performed by setting a desired size frame in advance, called a frame or box, for placing characters or images at desired positions of each page according to the content of the information to be edited or the like, and afterward flowing characters or images into this frame. After the design of the placement of characters or images has been decided in this manner, by flowing in characters or images, it is possible, in a well-planned and efficient manner, to display information as a whole in an organized manner, to display a plurality of pieces of information with a sense of unity, and to display information with the relationship between pieces of information made clear, and it is possible to create publications that are easily viewed and have excellent communicability of information. For example, with this sort of method, when for example creating a product catalog, it is possible to decide in advance positions at which product names will be listed, positions at which functions or the like of each product will be listed, or the like for a page on which products are listed, and it is possible to provide a catalog that has a unified design across a plurality of pages, is easy to view, an in which products are easy to find.

[Non-Patent Document 1]

"Adobe InDesign—Product Overview", [online], Adobe Systems Incorporated, [searched Aug. 24, 2005], Internet (URL: http://www.adobe.co.jp/products/indesign/overview.html)

However, in the conventional technology, because the size of characters or images to be placed is set in advance, when they cannot be fit into the frame due to an increase in characters or an enlargement of an image displayed in the frame, there is the problem that the portion of the characters or images that cannot fit are not displayed.

Also, when characters or images that were displayed in the frame have been deleted, due to only a area in which nothing is displayed remaining, there is the problem that unnecessary space is generated. For example, when this sort of information is output with a printer or the like, there is a risk of outputting a wasted page that does not include data, and that pages or the like will be output that are difficult to read due to much unnecessary space and have poor communicability of information.

Also, there are instances when, according to the content output into the frame, it is desired to modify the attributes or the like of information that is output into another frame. For example, in a description in a frame that outputs a product description, only when it is stated that that product is a new product, it is desired that the color of characters in a frame that outputs a heading for that product is set to red. In such a case as well, it is necessary to modify the characters of the heading after the user has read the description in the frame and judged whether or not that product is a new product. When, in this manner, according to the output content in the frame, the user has attempted to modify the attributes or the like of information that is output into another frame, all work needs to be done manually, which takes an inordinate amount of time, so there is the problem of poor work efficiency.

SUMMARY OF THE INVENTION

An information editing device of the present invention includes an object storage portion in which an object group that includes two or more objects that can have as data at least one of a character string or an image is stored, a placement information storage portion that stores placement area designation information, which is information for setting placement areas, which are two or more areas that do not overlap each other for respectively placing the objects that have been stored in the object storage portion and correspond to the objects, an object output portion that outputs, into placement areas that are set based on the placement area designation information, each of the objects corresponding to the respective placement areas, an input receiving portion that receives, for at least one of the objects output by the object output portion, a deletion instruction or a modification instruction that is an instruction that modifies the content of the object, and a placement modification portion that, according to the deletion instruction or modification instruction received by the input receiving portion, modifies the placement area of the object such that the placement area is placed without overlapping.

With this configuration, it is possible to adjust the placement of characters, pictures, or the like in response to modifications to these characters, pictures, or the like.

Also, in the above information editing device, the objects are hierarchized to have a tree structure, the object output portion deletes an object indicated by the deletion instruction, and the placement modification portion deletes a placement area in which the deleted object was placed, and modifies the position of one or more placement areas, where an object that is on the same level as the object designated by the deletion instruction and directly belongs to an object one level above the object designated by the deletion instruction is placed, to a position such that the area in which the deleted object was placed is closed up.

With this configuration, by adjusting only the placement of an object that belongs to an object above deleted characters, pictures, or the like, it is possible to adjust the placement of objects while preserving the placement relationship of information as a whole as much as possible. For example, in the case of a text composition, even if one character of one chapter is deleted, only the text that was not deleted in the same chapter is moved, and because the placement or the like of other chapters is not modified, there is not a large modification of the placement or the like of the initially designed text composition as a whole.

Also, in the above information editing device, the object group is hierarchized to have a tree structure, and includes two or more character string objects, which are objects that contain a character string, and the information editing device further includes an attribute value modification information storage portion storing one or more sets of a keyword that the character string object can include and attribute value modification information, which is information included with an attribute value of a character string object, a judgment portion that judges whether or not the character string contained in the character string object includes the keyword, and an attribute value modification portion that, when the judgment portion has judged that the character string contained in the character string object includes the keyword, modifies an attribute value of a character string object that has a predetermined corresponding relationship relative to the character string object that includes the keyword, to an attribute value that is set as a pair with the keyword.

With this configuration, it is possible to modify an attribute value of another character string object in response to the content of one character string object. Thus, a character string object such as a heading that corresponds to the character string object is modified by the content of that character string object, so that emphasized display or the like is possible, and thus information can be effectively provided.

Also, the information editing device according to the present invention includes an object storage portion in which an object group that includes two or more character string objects that can have as data a character string and have been hierarchized to have a tree structure, an attribute value modification information storage portion that is storing one or more sets of a keyword that the character string object can include and attribute value modification information, which is information included with an attribute value of a character string object, a judgment portion that judges whether or not the character string contained in the character string object includes the keyword, an attribute value modification portion that, when the judgment portion has judged that the character string contained in the character string object includes the keyword, modifies an attribute value of a character string object that has a predetermined corresponding relationship relative to the character string object that includes the keyword, to an attribute value that is set as a pair with the keyword, and an object output portion that outputs the character string object.

With this configuration, it is possible to modify an attribute value of another character string object in response to the content of one character string object. Thus, a character string object such as a heading that corresponds to the character string object is modified in response to the content of that character string object, so that emphasized display or the like is possible, and thus information can be effectively provided.

Also, the information editing system according to the present invention is provided with a server device and a client device, wherein the server device includes an object storage portion in which an object group that includes two or more objects that can have as data at least one of a character string or an image is stored, a placement information storage portion that stores placement area designation information, which is information for setting placement areas, which are two or more areas that do not overlap each other for respectively placing the objects that have been stored in the object storage portion and correspond to the objects, an object output portion that outputs, into placement areas that are set based on the placement area designation information, each of the objects corresponding to the respective placement areas, a source modification information receiving portion that receives source modification information for at least one of the objects being output by the object output portion, which is information for modifying the source of the object, and a placement modification portion that, according to the source modification information received by the source modification information receiving portion, modifies the placement area of the object such that the placement area is placed without overlapping, and the client device includes an editing object storage portion in which an object that is the same as an object being output by the object output portion can be stored, a source output portion that outputs the source of, among the objects being stored by the editing object storage portion, an object that is the same as an object being output by the object output portion, a source modification instruction receiving portion that receives a source modification instruction, which is an instruction that modifies the source of an object that is being output by the source output portion, and a source modification information sending portion that configures the source modification information based on the source modification instruction and sends it to the server device.

With this configuration, over a network it is possible to perform output with a modification of the source of an object by the client device reflected in the placement or the like of each object in the server device. Thus, for example, it is possible to perform editing work collaboratively between different locations.

According to the information editing device or the like according to the present invention, it is possible to provide an information editing device or the like in which it is possible to adjust the placement of characters, pictures, or the like in response to modifications to these characters, pictures, or the like.

BRIEF DESCRIPTION OF THE DRAWINGS

FIG. 4 shows the configuration of an object group of the information editing device in FIG. 1.

FIG. 5 shows a placement area designation information management table of the information editing device in FIG. 1.

FIG. 7 shows a placement area designation information management table of the information editing device in FIG. 1.

FIG. 9 shows a placement area designation information management table of the information editing device in FIG. 1.

FIG. 14 shows the configuration of an object group of the information editing device in FIG. 11.

FIG. 15 shows a placement area designation information management table of the information editing device in FIG. 11.

FIG. 16 shows an attribute value modification information management table of the information editing device in FIG. 11.

FIG. 17 shows the configuration of an object group of the information editing device in FIG. 11.

DETAILED DESCRIPTION OF THE INVENTION

Figure 1:
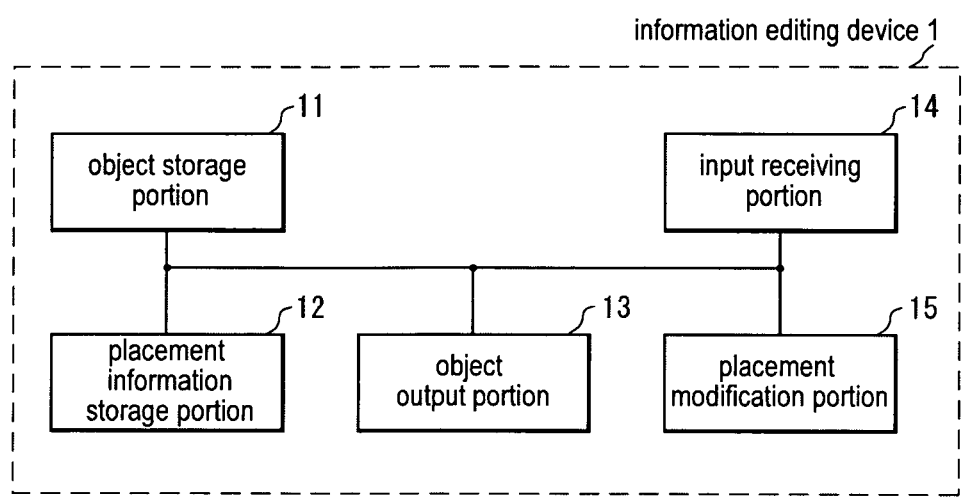
FIG. 1 is a block diagram of an information editing device according to Embodiment 1.

Embodiments of the information editing device and the like are described below with reference to the accompanying drawings. It should be noted that constituent elements that are denoted by the same reference numerals in the embodiments perform the same operation, and therefore may not be described in duplicate.

Embodiment 1

FIG. 1 is a block diagram of an information editing device according to the present embodiment.

An information editing device 1 is provided with an object storage portion 11, a placement information storage portion 12, an object output portion 13, an input receiving portion 14, and a placement modification portion 15.

In the object storage portion 11, an object group is stored that includes two or more objects that can have data for at least one of a character string or an image. An object is a constituent element of information that the information editing device 1 edits, and is data that includes at least one of a character string or an image. Here, an object that includes a character string is referred to as a character string object, and an object that includes an image is referred to as an image object. An object group is a grouping that includes two or more objects. Each object may have any sort of configuration. For example, an object may be configured from only a character string or an image, or may be a character string that has been delimited with a predetermined symbol or the like such as a tab, or may have identification information, attribute values, or the like added to a character string or image. An object may be configured from a tag and data correlated with the tag. Specifically, an object may be configured from a tag and an element of the tag, or configured from a tag and data linked to the tag. Also, an object may be a combination of a database record and an attribute and attribute value for the record. It is preferable that an object and an object group are described using XML (extensible markup language), because it is highly versatile. Also, in this case, the content of an object is, for example, data that is output from an object output portion 13 described below, an attribute value related to output of the object, and the like. For example, when an object is configured from a tag and an element or the like of the tag, the content of the object is the element of the tag and data or the like that is linked to the tag. Also, an object and an object group may be described with HTM, SGML, or the like. Also, if an object is an attribute value or the like of a database, the object group may constitute a CSV file, a data table, or the like. Objects may have a predetermined corresponding relationship with each other, or they may not have a relationship. Here, in particular, a case is described in which objects are hierarchized to have a tree structure. In this case, the hierarchal relationship of each object can be designated with XML, for example. Data for an image included in an object may be bitmap data, or it may be vector data. The storage referred to herein is a concept that includes temporary storage when, for example, sending, receiving, acquiring, or outputting data. The object storage portion 11 may be a nonvolatile storage medium, or it may be a volatile storage medium.

The placement information storage portion 12 stores placement area designation information, which is information for setting placement areas which are two or more areas that do not overlap each other and that correspond to the objects, for placing each of the objects that have been stored in the object storage potion 11. The placement areas are areas in which each object will be placed, and ordinarily, these include items called frames, boxes, or the like. The placement area designation information, specifically, is information for designating the size and position of the placement areas. For example, the placement area designation information is configured from information of the width and height of a placement area, and information of one point within a placement area, for example information of the coordinates of the upper left corner. Also, the placement area designation information may include information that designates a page or the like in which a placement area is output. Also, if, for example, the shape of a placement area is rectangular, the placement area designation information may be information of the coordinates of the upper left corner and the lower right corner. Also, the placement area designation information may be information of the coordinates of four corners of a placement area. Also, for example, the placement area designation information may be information of the width and height of a placement area, information that indicates the margin distance in the vertical and horizontal directions between a placement area and another placement area or the margin distance in the vertical and horizontal directions of a placement area relative to a area in which an object can be output, or the like. Information for designating the position of a placement area may be information that indicates the absolute position of coordinates or the like for an area in which it is possible to place a placement area on a page or the like, and it may be information that indicates the vicinity of an area in which it is possible to place a placement area or a position relative to another placement area. The corresponding relationship between placement area designation information and an object that is placed in a placement area that is set by placement area designation information may be managed in any manner. For example, it may be managed using a table or the like that has records of placement area designation information and objects in pairs. Also, the corresponding relationship between placement area designation information and an object that is placed in a placement area may be managed by setting identification information that is shared by objects or tags and corresponding placement area designation information. Ordinarily there is a one-to-one correspondence between each placement area and each object that is placed in each placement area. However, two or more placement areas may correspond with one object. For example, a configuration may be adopted in which when the object is one that has a character string, part of the character string is placed in one of the placement areas, and the remainder of the character string is placed in another placement area. The placement information storage portion 12 may be a nonvolatile recording medium, or it may be a volatile recording medium.

The object output portion 13 outputs, to placement areas that are set based on the placement area designation information, the objects that correspond to the respective placement areas. For example, the object output portion 13 acquires object information and placement area designation information, and outputs, into a placement area among the areas of a page or the like to which an object can be output that is positioned at a position designated by the placement area designation information and has a size designated by the placement area designation information, the objects that correspond to the respective placement areas. Also, a configuration may be adopted in which the object output portion 13 displays a frame line in the placement area frame in order to make it easy to visually identify the position of a placement area. The object output portion 13 may be considered to include an output device such as a display or printer, or may be considered to not include an output device such as a display or printer. The object output portion 13 can be realized with, for example driver software for an output device, or with driver software for the output device and an output device. Output is a concept that includes display to a display, printing to a printer, sending to an external device, and the like. Also, the configuration and the like of the object output portion 13 for setting a placement area can be realized with an MPU or a memory or the like. The processing procedure is ordinarily realized with software, and the software is recorded on a recording medium such as a ROM. However, the processing procedure may also be realized with hardware (a dedicated circuit).

The input receiving portion 14 receives, for at least one object that has been output by the object output portion 13, a deletion instruction or a modification instruction that is an instruction that modifies the content of the object. An instruction that modifies the content of an object is, for example, in the case of a character string object in which the object includes a character string, an instruction that modifies the character string input or attributes of the character string such as the size of characters. Also, for example, in the case of an image object in which the object includes an image, it is an instruction that modifies the size of the image or the like. The processing that deletes an output object or modifies the content of an object, for example inputting a character string or modifying the size of an image, is publicly known technology and therefore a description thereof is omitted. The input received by the input receiving portion 14 may be anything, such as input from a numeric keypad, keyboard, mouse, or menu screen. The input receiving portion 14 can be realized with a device driver for an input method such as a numeric keypad or keyboard, or control software for a menu screen or the like.

The objects that are output by the object output portion 13 are modified based on the input received by the input receiving portion 14. For example, when the input receiving portion 14 has received input of characters, the object output portion 13 outputs the object to which the input characters were added. Also, when the input receiving portion 14 has received an instruction to delete an object having a character string or an image, it deletes the output image or character string. A configuration may also be adopted in which, when performing such deletion, when the plurality of objects, e.g. the object group, have a tree structure, all of the objects belonging to the level below the object to be deleted are deleted. Also, on a case-by-case basis, information for an object stored in the object storage portion 11 may also be modified. For example, a configuration may also be adopted in which when the input receiving portion 14 has received character input, the object output portion 13 adds the characters that have been input to an object that is stored in the object storage portion 11.

A modification (including deletion) to an object based on input received by the input receiving portion 14 may be performed with the object output portion 13, for information that the object output portion 13 has read from the object storage portion 11 to a memory or the like. In this case, the modification based on the modification instruction is reflected in output, by outputting an object in memory that has been modified, for example rewritten, based on the modification instruction, from the object output portion 13. Also, a modification (including deletion) of an object based on a modification instruction may be performed for data that is stored in the object storage portion 11. In this case, the modification based on the modification instruction is reflected in output, by reading an object in the object storage portion 11 that has been modified based on the modification instruction with the object output portion 13 every time and outputting the modified object from the object output portion 13.

The placement modification portion 15 modifies the placement area of an object such that it is placed without placement areas overlapping, in response to a deletion instruction or modification instruction received by the input receiving portion 14. Specifically, when the placement modification portion 15 modifies a placement area, it updates the placement area designation information that is stored in the placement information storage portion 12 such that it becomes information that sets the placement area after modification. When the input receiving portion 14 has received a modification instruction for an object that the object output portion 13 is outputting such that the area necessary for output of the object will become larger than the placement area, the placement modification portion 15 modifies the size of the placement area such that the object, which has been modified based on the modification instruction, fits into the placement area, and modifies the position of other adjacent placement areas or the like such that after modification of the placement area it does not overlap with other adjacent placement areas. Also, when, for example, the input receiving portion 14 has received a deletion instruction for an object that the object output portion 13 is outputting, the placement area that corresponds to the object deleted by the object output portion 13 is deleted, and the positions of placement areas and the like that had been set and are adjacent to the deleted placement area are modified such that the deleted placement area in which the deleted object was placed is closed up. A configuration may also be adopted in which, particularly, when objects are in a tree structure relative to each other, the placement modification portion 15 deletes the placement area in which the deleted object was placed, and modifies the position of one or more placement areas, where an object that is on the same level as the object designated by the deletion instruction and directly belongs to an object one level above the object designated by the deletion instruction is placed, to a position such that the area in which the deleted object was placed is closed up. A configuration may also be adopted in which the placement area of another object is not modified. By adopting such a configuration, it is possible to perform local modification of a placement area. The placement modification portion 15 may move the position of a nearby placement area in any manner such that an area in which a placement area has been deleted is closed up. For example, a configuration may be adopted in which a placement area or the like that was nearby beside a deleted placement area is moved to the side, thus closing up the area in which the placement area was deleted. Also, for example, a configuration may be adopted in which a placement area or the like that was nearby below a deleted placement area is moved upward, thus closing up the area in which the placement area was deleted. Also, the placement modification portion 15 may modify the size of a placement area in any manner. For example, the placement modification portion 15 may increase the height of a placement area in the vertical direction to match the size of an object such that all of an object fits. Also, the placement modification portion 15 may increase the width of a placement area in the lateral direction. Also, the placement modification portion 15 may move the position of another nearby placement area such that a placement area whose size has been changed does not overlap in any manner. For example, the placement modification portion 15 may move a placement area that was nearby beside a placement area whose size has been changed in the lateral direction in the direction that width was increased, to the extent that the width was increased. The placement modification portion 15 may also move a placement area that was nearby below a placement area whose size has been changed in the vertical direction in the downward direction, to the extent that the height was increased. Also, for example, when a plurality of placement areas are placed on a plurality of pages, a placement area that is below or beside a placement area whose size has been changed may be moved to another page such as the next page, or a configuration may be adopted in which a new page is added and a placement area that is below or beside a placement area whose size has been changed is moved to that page. Also, a rule when modifying a placement area as described above may be set for each respective placement area, or a rule may be set for common placement areas, for example, for each placement area in which an object defined by the same tag or class is placed. This sort of rule may be stored in the placement information storage portion 12 along with placement area designation information, or may by stored on another recording medium or the like. The placement modification portion 15 ordinarily can be realized with an MPU, a memory, or the like. The processing procedure of the placement modification portion 15 is ordinarily realized with software, and the software is recorded on a recording medium such as a ROM or the like. However, it may also be realized with hardware (a dedicated circuit).

Figure 2:
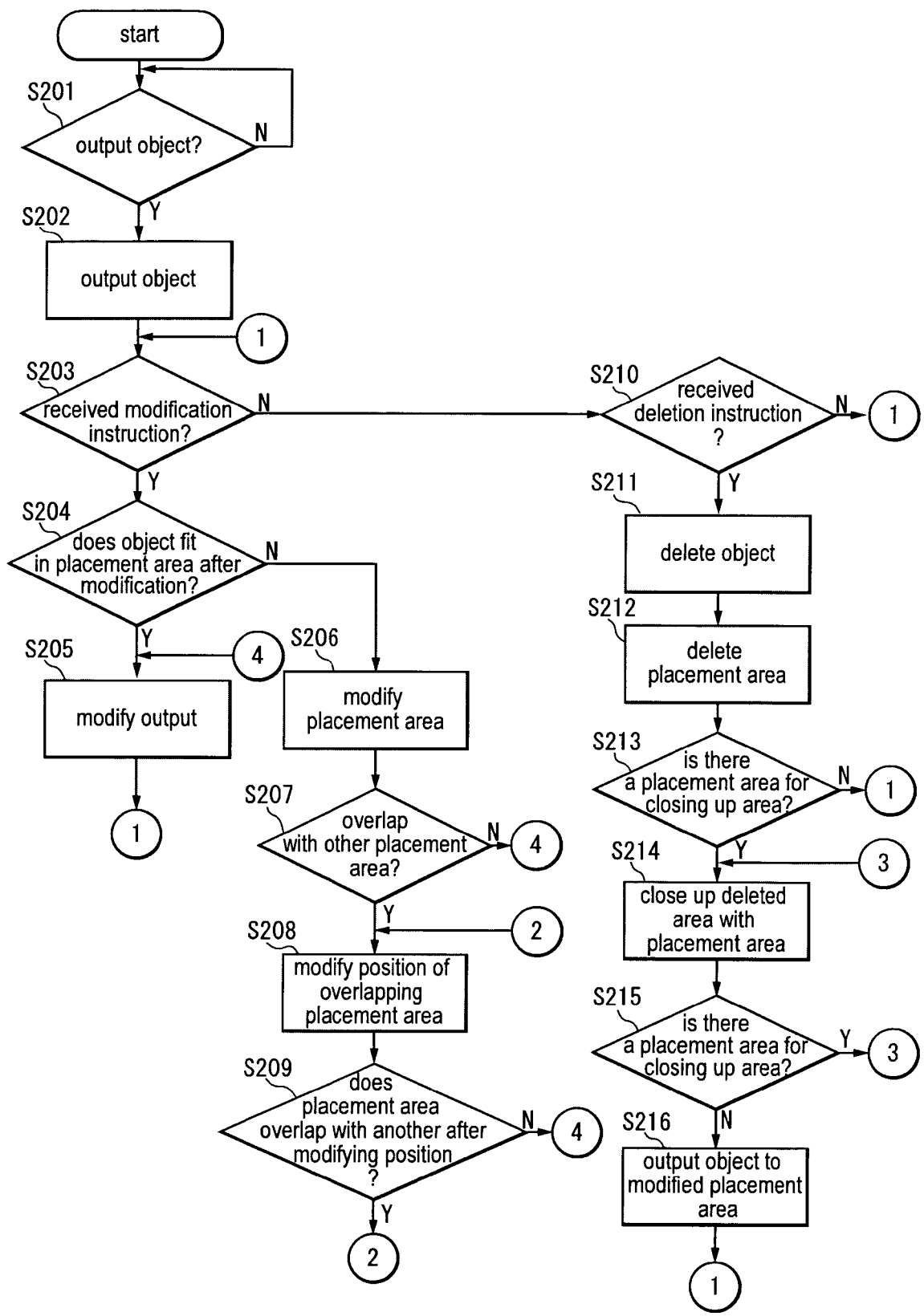
FIG. 2 is a flowchart that illustrates operation of the information editing device in FIG. 1.

Next is a description of operation of the information editing device using the flowchart in FIG. 2.

(Step S201) The object output portion 13 judges whether or not to output an object. The object output portion 13 may judge whether or not to output an object in any manner. For example, a configuration may be adopted in which the object output portion 13 judges whether or not a receiving portion such as the input receiving portion 14 has received an instruction to output an object, an instruction to edit information, or the like, and judges to output an object if such an instruction has been received. Also, the object output portion 13 may judge whether or not to output an object based on an instruction from another processing portion or the like. When an object will be output, the operation proceeds to Step S202, and when an object will not be output the operation returns to Step S201.

(Step S202) The object output portion 13 outputs an object. Specifically, the object output portion 13, based on placement area designation information that is stored in the placement information storage portion 12, acquires from the object storage portion 11 an object that corresponds to each placement area set by the placement area designation information, and outputs this object by placing it in a placement area that has been set by the placement area designation information that corresponds to the object. The position of the object in the placement area in the vertical and horizontal direction, for example left, center, top, or bottom alignment or the like, does not matter. Also, the object output portion 13 may output all of the objects that are stored in the object storage portion 11, or it may output only some of the objects, e.g. objects that have been designated by a user or the like or objects for which corresponding placement area designation information is present.

(Step S203) The placement modification portion 15 judges whether or not the input receiving portion 14 has received a modification instruction, e.g. such as an instruction for character input or enlargement of image size. If such a modification instruction has been received, the operation proceeds to Step S204, and if such a modification instruction has not been received, the operation proceeds to Step S210.

(Step S204) The placement modification portion 15 judges whether or not an object after modification fits in the placement area in which this object has been placed. Specifically, the size of the object modified based on a modification instruction is obtained, and compared to the size of the placement area in which this object is placed. The size of the placement area is acquired from the placement area designation information, or calculated based on information acquired from the placement area designation information. If the size of the object after modification is larger than the size of the placement area, the placement modification portion 15 judges that it does not fit, and if the size is not larger than the size of the placement area, the placement modification portion 15 judges that the object after modification does fit. If the object after modification fits, the operation proceeds to Step S205, and if the object after modification does not fit, the operation proceeds to Step S206.

(Step S205) The object output portion 13 outputs an object that has been modified based on, for example, an instruction to modify the object into a placement area. Also, when there is, for example, a placement area whose placement or size has been changed, the object output portion 13 outputs each corresponding object into the modified placement area. Then, the operation returns to Step S203. If, for example, the object is a character string object and the modification instruction is for character input, the character string object to which characters have been newly input may be accumulated in the object storage portion 11 as a new object corresponding to this placement area, or the above object may be overwritten with the new object.

(Step S206) The placement modification portion 15 modifies the placement area, that is, modifies the size of the placement area, such that the object after modification fits into the placement area. Specifically, the placement modification portion 15 modifies the placement area designation information that sets the size of the placement area. This size modification may be performed according to, for example, a rule that has been determined in advance, such as a rule that enlarges the placement area in the downward direction.

(Step S207) The placement modification portion 15 judges whether or not the placement area after size modification overlaps another placement area. If the placement area after size modification overlaps another placement area, the operation proceeds to Step S208, and if the placement area after size modification does not overlap another placement area, the operation proceeds to Step S205.

(Step S208) The placement modification portion 15 modifies the position of a placement area that overlaps the placement area that was modified in Step S206 such that it does not overlap. This modification may be performed according to, for example, a rule that has been set in advance, such as a rule that the position modification is always limited to moving in the downward direction, or a rule that in the case that the placement area after moving does not fit within the original page, a new page is created, and the placement area is moved to that page.

(Step S209) The placement modification portion 15 judges whether or not the placement area that was moved in Step S208 overlaps another placement area. If the placement area after moving overlaps another placement area, the operation returns to Step S208, and if the placement area after moving does not overlap another placement area, the operation proceeds to Step S205.

(Step S210) The placement modification portion 15 judges whether or not the input receiving portion 14 has received a deletion instruction. When a deletion instruction has been received, the operation proceeds to Step S211, and when a deletion instruction has not been received, the operation returns to Step S203.

(Step S211) The object output portion 13 deletes the object for which a deletion instruction was received. A configuration may also be adopted in which the object output portion 13 also deletes an object stored in the object storage portion 11 that is the original of the object that has been deleted.

(Step S212) The placement modification portion 15 deletes the placement area in which an object has been deleted. Specifically, the placement modification portion 15 deletes placement area designation information wherein the placement area in which an object has been deleted was set. The deletion referred to here also includes making it impossible to set a placement area that has been deleted, based on placement area designation information.

(Step S213) The placement modification portion 15 judges whether or not a placement area is present for closing up the area in which the placement area deleted in Step S212 had been placed. A rule or the like for what sort of placement area is judged to be a placement area for closing up is set in advance. For example, when the placement modification portion 15 judges whether or not there is another placement area below the deleted placement area among the placement areas that are placed on the same page as the deleted placement area, and there is another placement area below, it is judged that a placement area for closing up is present. Also, a configuration may be adopted in which, when objects placed in placement areas have been hierarchized to have a tree structure, the placement modification portion 15 judges whether or not one or more placement areas are present in which an object is placed that directly belongs to an object that is one level above an object designated by a deletion instruction, and is on the same level as the object designated by a deletion instruction, and if such a placement area is present, the placement modification portion 15 judges that a placement area for closing up is present. When a placement area for closing up is present, the operation returns to Step S214, and when a placement area for closing up is not present, the operation returns to Step S203.

(Step S214) The placement modification portion 15 moves the placement area for closing up that has been judged present in Step S213 such that the area in which the placement area deleted in Step S212 was placed is closed up. Specifically, the placement area designation information prior to movement is updated with placement area designation information for setting the placement area after movement. This movement is performed according to, for example, a rule that has been set in advance, such as a rule to move upward, or a rule that a placement area on the next page is not moved. A configuration may also be adopted in which when objects placed in placement areas have been hierarchized to have a tree structure, a plurality of placement areas are present in which an object is placed that directly belongs to an object that is one level above an object specified by a deletion instruction, and is on the same level as the object designated by the deletion instruction, these placement areas are made one group, and only the placement areas in this group are moved such that the deleted area is closed up.

(Step S215) The placement modification portion 15 judges whether or not there is a placement area that closes up the area in which the placement area that was moved in Step S214 was placed. This judgment is performed by the same processing as Step S213. When there is a placement area that closes up, the operation returns to Step S214, and when there is not, the operation returns to Step S203.

(Step S216) The object output portion 13 outputs each corresponding object to the placement area whose position has been changed. Then, the operation returns to Step S203.

In the flowchart in FIG. 2, processing is ended by turning off power or a processing-ending interruption.

Figure 3:
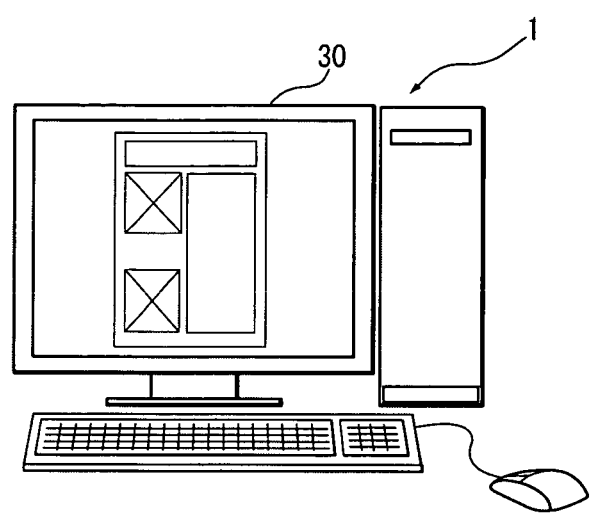
FIG. 3 is a conceptual diagram of the information editing device in FIG. 1.

Following is a description of a specific operation of the information editing device in the present embodiment. FIG. 3 is a conceptual diagram of the information editing device. Here a case is described in which the object output portion 13 has a display 30 as a display device.

FIG. 4 shows the configuration of an object group that is stored in the object storage portion 11. Here, for example, the object group is described with XML. Data enclosed by "<" and ">" is a tag, and characters enclosed by "<" and ">" are the attribute of that tag. Also, information enclosed by an opening tag "<attribute>" and a closing tag "</attribute>" are an element. A combination of an opening tag, a closing tag, and an element correspond to one object. Also, when another object is inserted between one opening tag and closing tag, the inserted object becomes an object at a level below the object defined by the insertion destination opening tag and closing tag, more specifically, it becomes an object that directly belongs. Ordinarily, objects that are defined by the same attribute tag are output as information having the same attribute. For example, character string objects with the same attribute are output with the same attributes for font, character size, and the like applied. For example, for objects defined by the same attribute tag in this manner, as technology that defines the same output attribute, for example, cascading style sheets (CSS) and the like are known. An ID in the opening tag is management information for identifying the object, and is referred to here as an object ID. This object group, as an example, is configured from objects used in order to configure one product catalog. A "product catalog" tag defines an object that indicates the product catalog. A "product information" tag defines an object that indicates one product, a "product image" tag defines an image object that expresses an image of the product, a "place of production" tag defines a character string object that expresses a place of production for the product, a "product name" tag defines a character string object that expresses the name of the product name, a "product code" tag defines a character string object that expresses a product code, a "product unit" tag defines a character string object that indicates the weight of the product, a "copy" tag defines a character string object that expresses a description of the product, and a "price including tax" tag defines a character string object that expresses a price including tax for the product. In the "product image" tag, information that specifies a link for image information that constitutes this image object, such as "<img src="/images/ . . . .jpg"/>", is stated.

FIG. 5 shows a placement area designation information management table for managing placement area designation information that is stored by the placement information storage portion 12. The placement area designation information management table includes the attributes "area ID", "coordinates", "size", "page", and "object ID". The "area ID" is identification information for identifying a placement area, the "coordinates" are coordinate information for the upper left corner of a placement area within a page, the "size" is information of the width and height of the placement area, the "page" is the number of the page on which the placement area is placed, and the "object ID" is an ID for specifying the object that is placed in the placement area, and corresponds to the object ID within the opening tag in FIG. 4. Here, as an example, points are used as the units for "coordinates" and "size.

First, for example, it is assumed that in order to edit the product catalog, a user, using a menu or the like, has given an instruction to the information editing device 1 to open a screen in which the product catalog, in which objects have been placed, is edited.

Figure 6:
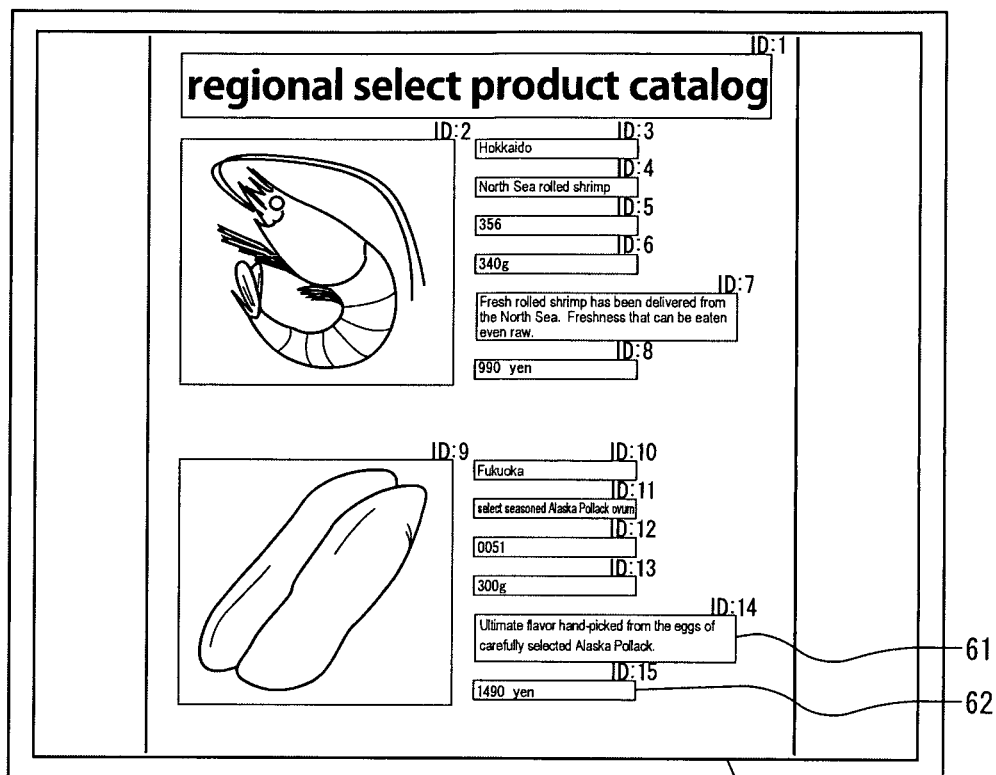
FIG. 6 shows an example of output of the information editing device in FIG. 1.

Based on this instruction, the object output portion 13 acquires the object that has the same object ID as the object ID of each set of placement area designation information in order from the object group shown in FIG. 4 based on the placement area designation information management chart shown in FIG. 5, and places each object in the placement area that is set with the placement area designation information that corresponds to each object. Then an image obtained by placing each object, as shown in FIG. 6, is output to the display 30. Here, with respect to each placement area, frame lines are drawn so that the positional relationship between placement areas is easy to judge when editing. The ID in the upper left corner of each placement area is not actually displayed but is added for the sake of description, corresponds to the IDs in FIG. 5, and indicates which placement area corresponds to which set of placement area designation information. For example, the "object ID" in the set of placement area designation information whose "area ID" is "4" in FIG. 5 is "005", so the element of the object whose ID is "005" in the opening tag in FIG. 4, i.e. the character string "North Sea rolled shrimp", is output into a placement area 61 that is set by the set of placement area designation information whose "area ID" is "4". Below, a placement area that is set by the set of placement area designation information whose "area ID" is "4" is referred to simply as a placement area whose "area ID" is "4". This is likewise true in cases where the "area ID" is a number other than "4".

Here, it is assumed that the user has displayed a cursor for inputting characters by clicking with a pointer or the like in a placement area 61 whose "area ID" is "14" in the screen shown in FIG. 6, and then additionally input a character string from a keyboard or the like. The input character string is "2006 limited edition product. Quantity is limited to 200 boxes, so place orders early.". The input receiving portion 14 receives this character string that has been input.

The placement modification portion 15, because the input receiving portion 14 has received a character string, judges that the input receiving portion 14 has received a modification instruction, and calculates the size of a character string object obtained by adding this added character string to the character string object that was placed in the placement area 61. Here, the size of a character string "Ultimate flavor hand-picked from the eggs of carefully selected Alaska Pollack. 2006 limited edition product. Quantity is limited to 200 boxes, so place orders early.", when the character string is folded back to match the width of the placement area, is calculated from the character size, spacing between characters, line spacing, and the like. The width of the character string obtained by calculation is 240 points, and the height is 74 points.

Next, the placement modification portion 15 acquires the size of the placement area 61 from the placement area designation information. Here, as shown in FIG. 5, the size of the placement area 61 is 240 points wide and 44 points tall.

Thus, because all of the character string objects that have been modified by the modification instruction do not fit into the present placement area 61, the placement modification portion 15 modifies the size of the placement area 61 according to a rule set in advance such that these character string objects fit. Here, it is assumed that a rule is set that "Only the height of the placement area is modified such that the character strings all fit, with the width of the placement area always unchanged. The direction in which the height is increased by modification is the downward direction." The placement modification portion 15, according to this rule, such that a character string object with a width of 240 points and a height of 74 points fits into the placement area 61, decides to modify the size of the placement area 61 so that only the height is changed to 74 points, which is the same as the height of the character string object, while the width is left unchanged from 240 points. The "size" attribute of the set of placement area designation information whose "area ID" in the placement area designation information management table shown in FIG. 5 is "14" is rewritten with this value.

Next, the placement modification portion 15 judges whether or not the placement area 61 whose size has been changed overlaps another placement area. For example, the placement modification portion 15 obtains the range of x coordinates and the range of y coordinates for the placement area 61 whose size has been changed, and judges whether or not the range of x coordinates and the range of y coordinates for the placement area 61 overlaps with at least a portion of the range of x coordinates and the range of y coordinates for another placement area, and when there is a portion that overlaps, the placement modification portion 15 can judge that these placement areas overlap.

If there is no overlap, the object output portion 13 outputs the modified character string into the placement area 61 whose size was changed, based on the rewritten placement area designation information management table.

If there is overlap, the placement modification portion 15 moves the overlapping object according to a rule set in advance. Here, because a placement area 62 whose "area ID" is "15" overlaps with the placement area 61 whose size is desired to be changed, the position of the placement area 62 is moved. It is assumed that the rule when this movement is performed is a rule that "The placement area is moved downward such that the margin with the display area positioned above is 18 points. When the placement area protrudes from the page after being moved, the placement area is moved to the head of the next page." According to this rule, the placement modification portion 15 decides to position the top edge of the placement area 62 18 points below the bottom of the placement area 61 whose size has been modified. Here, because the bottommost y coordinate at which the display area of the page can be placed is 800 points, after movement the placement area 62 fits within the original page, so it is not necessary to move the placement area 62 to the next page. Then, the placement modification portion 15 modifies the "coordinates" of the placement area designation information whose "area ID" is "15" in the placement area designation information management table in FIG. 5 to "(300, 676)", such that the placement area 62 is set to this position.

Next, the placement modification portion 15 judges whether or not there is a placement area that overlaps this placement area 62 that has been moved. Here, because there is not an overlapping placement area, the object output portion 13 performs output based on the rewritten placement area designation information management table.

Figure 8:
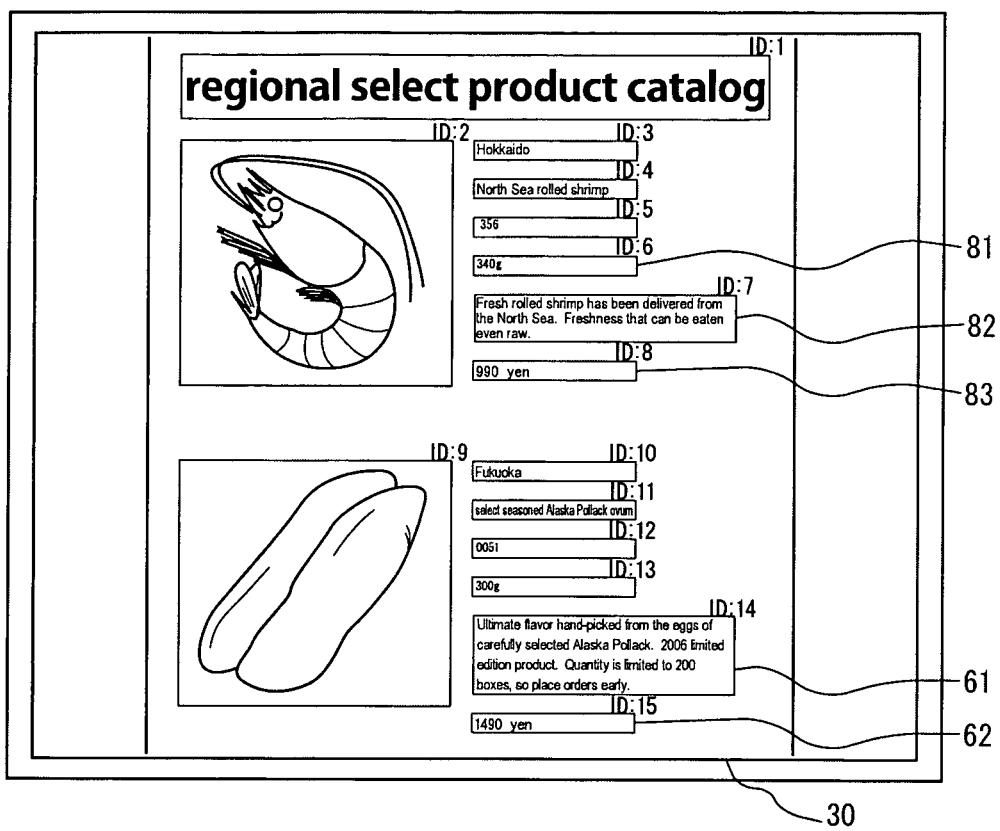
FIG. 8 shows an example of output of the information editing device in FIG. 1.

FIG. 7 shows the rewritten placement area designation information management table. FIG. 8 shows an example of the display of the display 30 when an object is placed in a placement area that has been modified by a modification instruction.

It is assumed that next a user, in the screen shown in FIG. 8, has selected the character string in a placement area 81 whose "area ID" is "6" using a mouse or the like, and has pressed a delete key or the like of a keyboard.

With this operation, the input receiving portion 14 receives a deletion instruction for the character string object in the placement area 81.

Based on this deletion instruction, the object output portion 13 deletes the character string object that was placed in the placement area 81, whose ID is "007".

Also, the placement modification portion 15 deletes the placement area 81, which corresponds to this deleted character string object.

Next the placement modification portion 15 judges whether or not one or more placement areas are present in which an object is placed that directly belongs to an object that is one level above an object designated by a deletion instruction, and is on the same level as the object whose object ID is "007" and has been designated for deletion. Here, as objects that are on the same level as an object whose object ID is "007", and directly belong to an object that is one level above an object for which a deletion instruction is designated, i.e. an object whose object ID is "002", it is judged from the configuration of the object group shown in FIG. 4 that objects are present with the object IDs "003", "004", "005", "006", "008", and "009". Also, as placement areas that correspond to these objects, there are placement areas whose "area ID" is "2", "3", "4", "5", "7", and "8", so the placement modification portion 15 judges that a placement area is present. Moreover, here, of these placement areas, the placement modification portion 15 judges, from the value of y of the "coordinates" attribute in the placement area designation information management table shown in FIG. 7, the placement area positioned below the deleted placement area. Here, the value of y of the "coordinates" attribute for the deleted placement area whose "area ID" is "6" is "248", and the placement areas whose value of y of the "coordinates" attribute is less than this are the placement areas whose "area ID" is "7" and "8".

The placement modification portion 15, first, according to a rule that has been set in advance, moves the position of a placement area 82 whose "area ID" is "7", which is, of the placement areas whose "area ID" is "7" and "8", the placement area closest to the deleted placement area, and closes up the area in which the deleted placement area was placed. Here, it is assumed that a rule was set that "The placement area is moved upward such that the margin with the display area positioned above is 18 points. When the placement area protrudes from the page after being moved, the placement area is not moved." According to this rule, the placement modification portion 15 decides to move the placement area 82 such that the top edge of the placement area 82 is 18 points below the bottom of the placement area whose "area ID" is "5" and is present directly above the deleted placement area 81. Here, because the placement area 82 fits within the original page after movement in this manner, the placement area 82 may be moved. Then, the placement modification portion 15 modifies the "coordinates" of the placement area designation information whose "area ID" is "7" in the placement area designation information management table in FIG. 7 to "(300, 248)", such that the placement area 82 is set to this position.

Further, the placement modification portion 15 performs the same judgment as described above, and decides to use a placement area 83 whose "area ID" is "8" as a placement area for closing up the area in which there is not a placement area, generated by the deleted placement area 81 and the moved placement area 82. Then, the placement modification portion 15 moves the position of the placement area 83 according to the same rule as described above, and changes the "coordinates" of the placement area designation information to "(300), (310)", such that the area in which there is no placement area is closed up by the placement area 83, whose "area ID" is "8".

Further, the placement modification portion 15 performs the same judgment as described above, and judges whether or not there is a placement area for closing up the area in which there is not a placement area, generated by the deleted placement area 81 and the moved placement areas 82 and 83. Here, because there is not a target placement area, the object output portion 13 performs output based on the modified placement area designation information management table.

Figure 10:
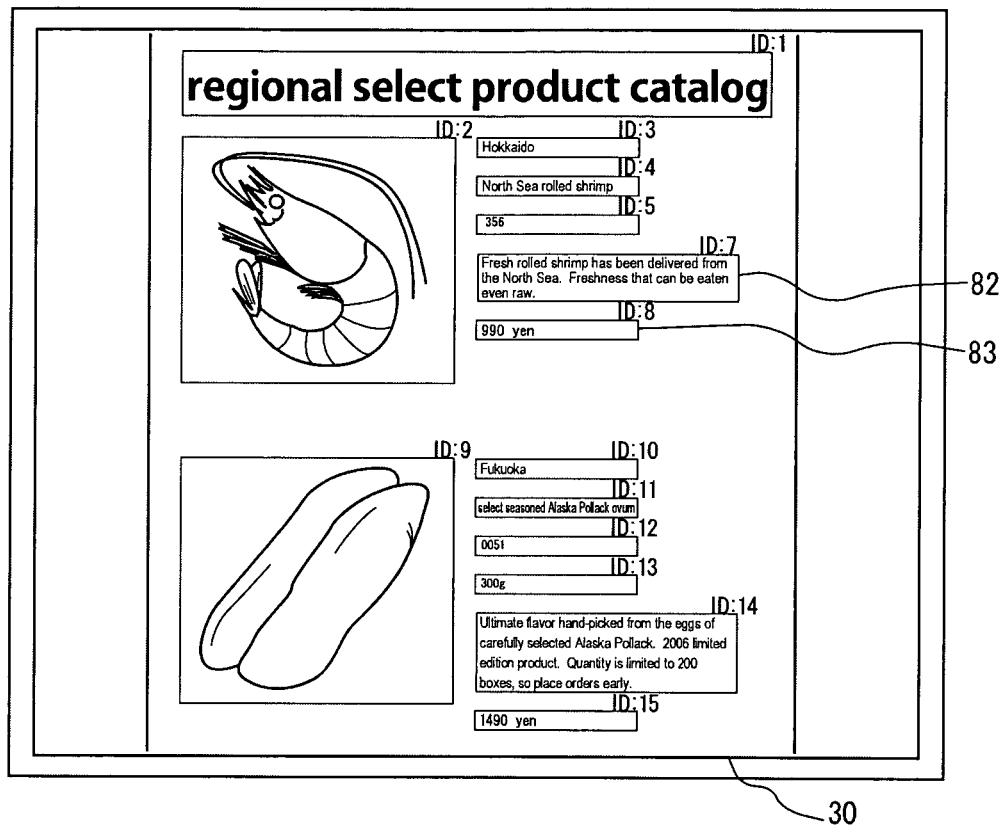
FIG. 10 shows an example of output of the information editing device in FIG. 1.

FIG. 9 shows the rewritten placement area designation information management table. FIG. 10 shows an example of the display of the display 30 when an object is placed in a placement area that has been modified by a modification instruction.

Above, according to the present embodiment, when the object no longer fits inside the placement area due to modification of the object in the placement area, the placement area is enlarged, and further, when the placement area overlaps another placement area due to the placement area being enlarged, by shifting the position of the overlapped other placement area it is possible to output all of the object that no longer fit in the placement area. Further, even when the placement area has been enlarged, with respect to the other area that overlaps with this placement area, by modifying the placement area such that it does not overlap with this placement area, it is possible to prevent the enlargement from becoming an obstacle for output of an object into the other placement area.

Also, when the object in the placement area has been deleted, the placement area of this deleted object is also deleted, and further the area in which there is not a placement area, generated by deletion of this placement area, is closed up with a nearby placement area, reducing wasted or unnecessary space, so that it is possible to provide information with excellent communicability of information.

The rules and the like used when enlarging or moving a placement area, described in the above specific examples, are examples, and it is preferable that such rules are appropriately set by the content and the like of objects, from the configuration and the like of the page.

The information editing device according to the present embodiment may be realized in a server-client system. In such a case, a configuration may be adopted in which the server device is provided with an object storage portion in which an object group is stored that includes two or more objects that can have as data at least one of a character string or image, a placement information storage portion that stores placement area designation information that is information for setting placement areas that are two or more areas that do not overlap each other, for respectively placing the objects that have been stored in the object storage portion, and that correspond to the objects, an object output portion that outputs each of the objects corresponding to the respective placement areas into placement areas that are set based on the placement area designation information, an input receiving portion that receives a deletion instruction or a modification instruction that is an instruction that modifies the content of an object, for at least one of the objects output by the object output portion, and a placement modification portion that modifies the placement area of the objects such that, corresponding to the deletion instruction or the modification instruction received by the input receiving portion, the placement areas are placed without overlapping.

Also, it is preferable that the client device is provided with a receiving portion that receives information or the like for outputting an object, received via a network or the like by an object output portion or the like of the server device, and an output portion that performs output of the received information, for example display or the like, and in addition, that the client device is provided with a receiving portion that receives a modification instruction, and a sending portion that sends a received modification instruction to the input receiving portion of the server device via a network or the like.

Also, in the above embodiments, each constituent element may be configured with dedicated hardware, or alternatively, constituent elements that can be realized with software may be realized by executing a program. For example, each constituent element can be realized by a program execution portion of a CPU or the like reading and executing a software program that has been recorded on a recording medium such as a hard disk or semiconductor memory. The software that realizes the information editing device in each embodiment above is the below sort of program. That is, this program is a program for allowing a computer to execute an object output step of outputting each object corresponding to respective placement areas that are set based on the placement area designation information, which is information for setting placement areas that are two or more non-overlapping areas for respectively placing two or more objects that can have as data at least one of a character string or an image, an input receiving step of receiving a deletion instruction or a modification instruction that is an instruction to modify the content of an object, for at least one of the objects output in the object output step, and a placement modification step of modifying the placement area of the objects such that, corresponding to the deletion instruction or the modification instruction received in the input receiving step, the placement areas are placed without overlapping.

In the above program, in a sending step of sending information, a receiving step of receiving information, or the like, processing that is performed by hardware (processing that can only be performed with hardware), for example processing performed by a modem, an interface card, or the like in the sending step, is not included. The same is also true in other embodiments.

Also, this program may be executed by downloading from a server or the like, or may be executed by reading a program that has been recorded on a predetermined recording medium (for example, an optical disk such as a CD-ROM, a magnetic disk, a semiconductor memory, or the like). The same is also true in other embodiments.

The computer that executes this program may be a single computer or a plurality of computers. That is, centralized processing or distributed processing may be performed. The same is also true in other embodiments.

Embodiment 2

The information editing device according to the present embodiment has a configuration in which, in the information editing device according to above Embodiment 1, when a specific keyword is included in one character string object, an attribute of a character string object related to this character string object is modified.

Figure 11:
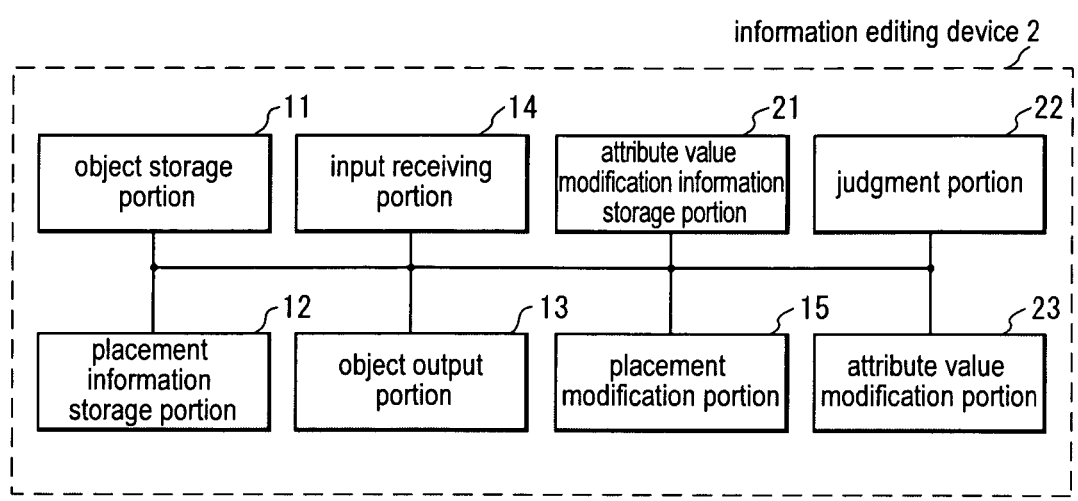
FIG. 11 is a block diagram of an information editing device according to Embodiment 2.

FIG. 11 is a block diagram of the information editing device according to the present embodiment.

An information editing device 2 is provided with the object storage portion 11, the placement information storage portion 12, the object output portion 13, the input receiving portion 14, the placement modification portion 15, an attribute value modification information storage portion 21, a judgment portion 22, and an attribute value modification portion 23.

The configuration of the object storage portion 11, the placement information storage portion 12, the object output portion 13, the input receiving portion 14, and the placement modification portion 15 is the same as in Embodiment 1, and so a description thereof is omitted. In the present embodiment, a plurality of objects are hierarchized to have a tree structure, and an object group stored in the object storage portion 11 has two or more character string objects, which are objects that have a character string.

The attribute value modification information storage portion 21 stores one or more sets of a keyword that a character string object can have and attribute value modification information, which is information included with an attribute value of the character string object. A keyword is a predetermined character string that has been set in advance. An attribute value of a character string object is a value that determines an attribute of the characters that constitute the character string when outputting the character string included in the character string object, such as character size, font, character modifications such as italic, narrow, or bold-faced type, and character color. The data structure of the attribute value of the character string object does not matter. As technology that applies an attribute value to this sort of character string, for example, it is possible to use technology such as the CSS described above. The attribute value modification information includes one or more pairs of a keyword and attribute value modification information. The attribute value modification information storage portion 21 may be a nonvolatile recording medium, or it may be a volatile recording medium.

The judgment portion 22 judges whether or not the character string included in the character string object includes the keyword. The character string object subject to judgment by the judgment portion 22 may be any of the character string objects. For example, it may be an object stored in the object storage portion 11, or an object that the object output portion 13 has acquired for output, or an object that has been output. Also, the character string object subject to judgment by the judgment portion 22 may be an object whose content has been modified by input of a character string received by the input receiving portion 14. The judgment portion 22, specifically, searches for whether or not a keyword stored in the attribute value modification information storage portion 21 is included in each character string object, for example, a character string object acquired by the object output portion 13 in order to output the object, and when there is a coinciding character string, the judgment portion 22 judges that that character string object includes the keyword. The timing or trigger for the processing in which the judgment portion 22 searches for whether the keyword is included and performs judgment does not matter. For example, the processing may be performed when the object output portion 13 outputs an object, or immediately after the object output portion 13 outputs an object, or when the input receiving portion 14 has received input of a character string. Also, the processing may be performed when a receiving portion such as the input receiving portion 14 has received an instruction to perform the above processing from a user. The judgment portion 22, ordinarily, can be realized from an MPU, a memory, or the like. The processing procedure of the judgment portion 22 is ordinarily realized with software, and the software is recorded on a recording medium such as a ROM. However, it may also be realized with hardware (a dedicated circuit).

When the judgment portion 22 has judged that a keyword is included, with respect to the character string object that includes this keyword, the attribute value modification portion 23 modifies an attribute value of a character string object having a predetermined corresponding relationship to an attribute value that becomes a pair with this keyword. An "attribute value that becomes a pair with this keyword" is an attribute value of a character string object that attribute value modification information including the keyword is holding paired with the keyword. A "predetermined corresponding relationship" may be any sort of corresponding relationship, if one or more objects can be specified. A character string object having a predetermined corresponding relationship is, for example, a character string object that has specific identification information that has been associated with a character string object including the keyword, or a character string object that has a specific tag. Also, a character string object having a predetermined corresponding relationship may be an object that has a predetermined hierarchical relationship relative to a character string object that includes the keyword. For example, it may be an object on a level below that directly belongs to the character string object that includes the keyword, or an object on a level above to which the character string object that includes the keyword directly belongs, or the like. Also, it may be a character string object that directly belongs to an object one level above the character string object that includes the keyword. Also, it may be an object on a level that is a predetermined number of levels above the character string object that includes the keyword, or on object on a level that is a predetermined number of levels below. It does not matter what level is the "predetermined number of levels". For example, a character string object on a level that is a predetermined number of levels above may be a character string object on a level that is one level above, or it may be a character string object on a level that is two levels above. Also, in this case, particularly, a plurality of levels may be designated at the same. This "predetermined level" may be set in any manner. For example, the level number may be set with a numerical value that is an integer, for example, when the level structure between objects, as in a specific example of Embodiment 1 described above, is defined by tags using XML or the like, the "predetermined level" may be designated with a tag. Also, a configuration may be adopted in which when the judgment portion has judged that the keyword is included, the attribute value modification portion 23 modifies, for a character string object that includes the keyword, the attribute value of a character string object having the predetermined corresponding relationship as described above from among objects that are on a level that is a predetermined number of levels above, and objects that are on a level below that level, to an attribute value that becomes a pair with the keyword. For example, the attribute value modification portion 23 may modify only the attribute value of an object that is defined with a specific tag that has been associated with a character string object that includes the keyword, from among objects that are on a level below an object that is on a level above a character string object that includes the keyword. The attribute value modification portion 23 may modify an attribute value of the character string object in any manner. Ordinarily, the attribute value modification portion 23 modifies the attribute value by rewriting or adding to the attribute value of the character string of the character string object. If the attribute value of the character string object is kept associated with the character string object, the character string object may have the attribute value, or the attribute value may be accumulated separately from the character string object as information for managing the attribute value. When it is conceived that an attribute value that is set for a character string object is duplicated, for example, in a case such as when two attribute values are set for character color for one character string object, priority may be given to either of the attribute values, in any manner. For example, the attribute value that is set by the attribute value modification portion 23 may be given priority over the character string that has been set in advance. Also, a configuration may be adopted in which information for judging priority order is given to the attribute value itself, and based on this information the object output portion 13 judges which attribute value to use when performing output. Also, priority may be given to the attribute value that is read first or to the attribute value that is read later when the object output portion 13 performs output. The attribute value modification portion 23 may perform modification of an attribute value for an object that is stored anywhere. For example, the attribute value modification portion 23 may perform modification of an attribute value for an object that is acquired by the object output portion 13 and stored in a memory or the like, or it may perform modification of an attribute value for an object that is stored in the object storage portion 11. The attribute value modification portion 23 ordinarily can be realized from an MPU, a memory, or the like. The processing procedure of the attribute value modification portion 23 is ordinarily realized with software, and the software is recorded on a recording medium such as a ROM. However, it may also be realized with hardware (a dedicated circuit).

Figure 12:
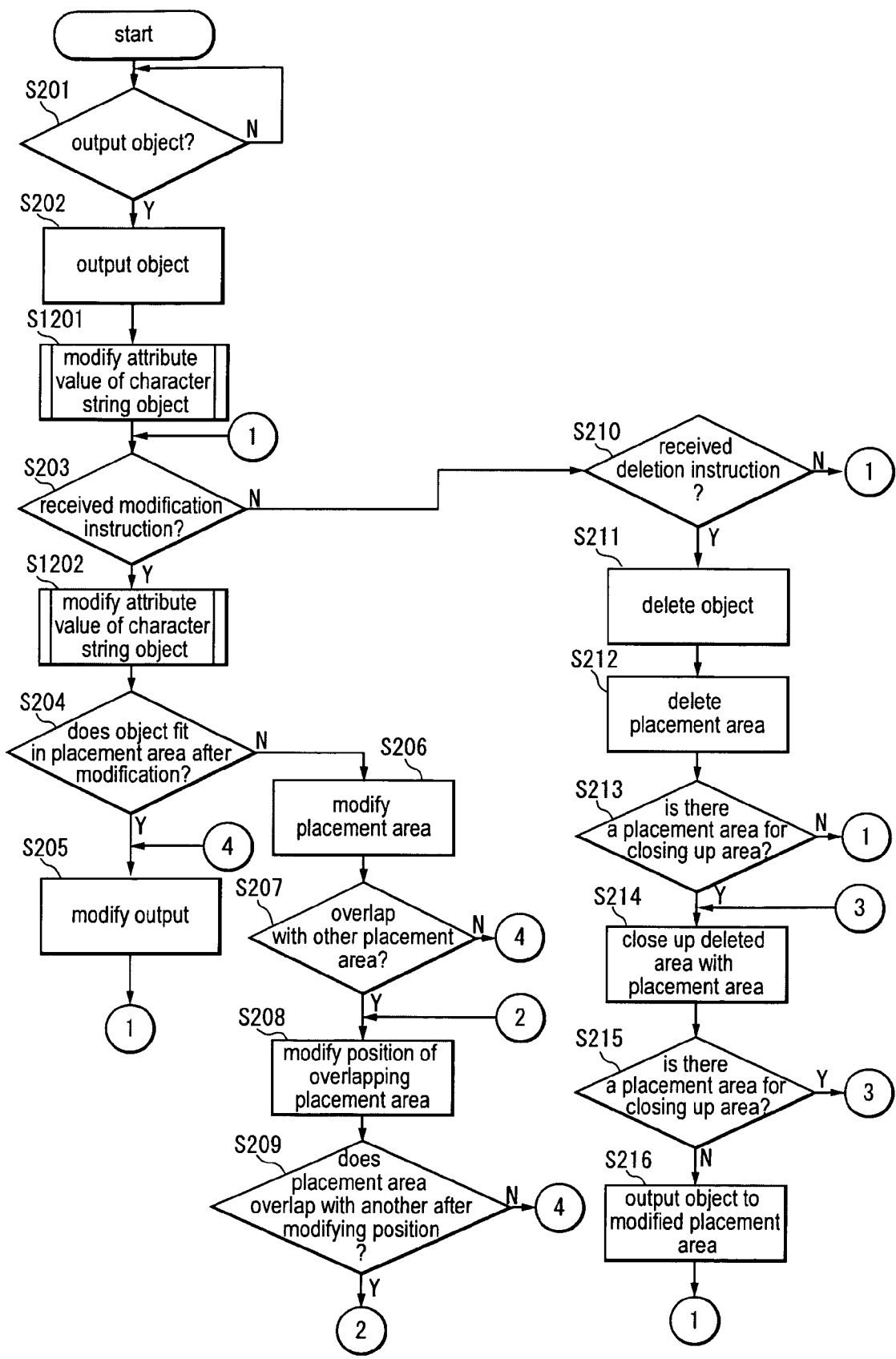
FIG. 12 is a flowchart that illustrates operation of the information editing device in FIG. 11.

Next is a description of operation of the information editing device with reference to the flowchart in FIG. 12. In FIG. 12, the same reference numerals as in FIG. 2 indicate the same or corresponding processing, and here a description thereof will be omitted.

(Step S1201) The judgment portion 22 and the attribute value modification portion 23 modify the attribute value of the character string object. The details of this processing are stated below with reference to the flowchart in FIG. 13. This processing may be performed, in Step S202, after the object output portion 13 acquires the object, and before the object output portion 13 outputs the acquired object, or it may be performed, as a step prior to Step S202, for an object stored by the object storage portion 11.

(Step S1202) The judgment portion 22 and the attribute value modification portion 23 modify the attribute value of the character string object. Other than judging only for a character string object for which input of characters was received in Step S203, whether a keyword is included, this processing is the same as the processing in Step S1201, and so a description is omitted.

In the flowchart in FIG. 12, processing is ended by turning off power or a processing-ending interruption.

Figure 13:
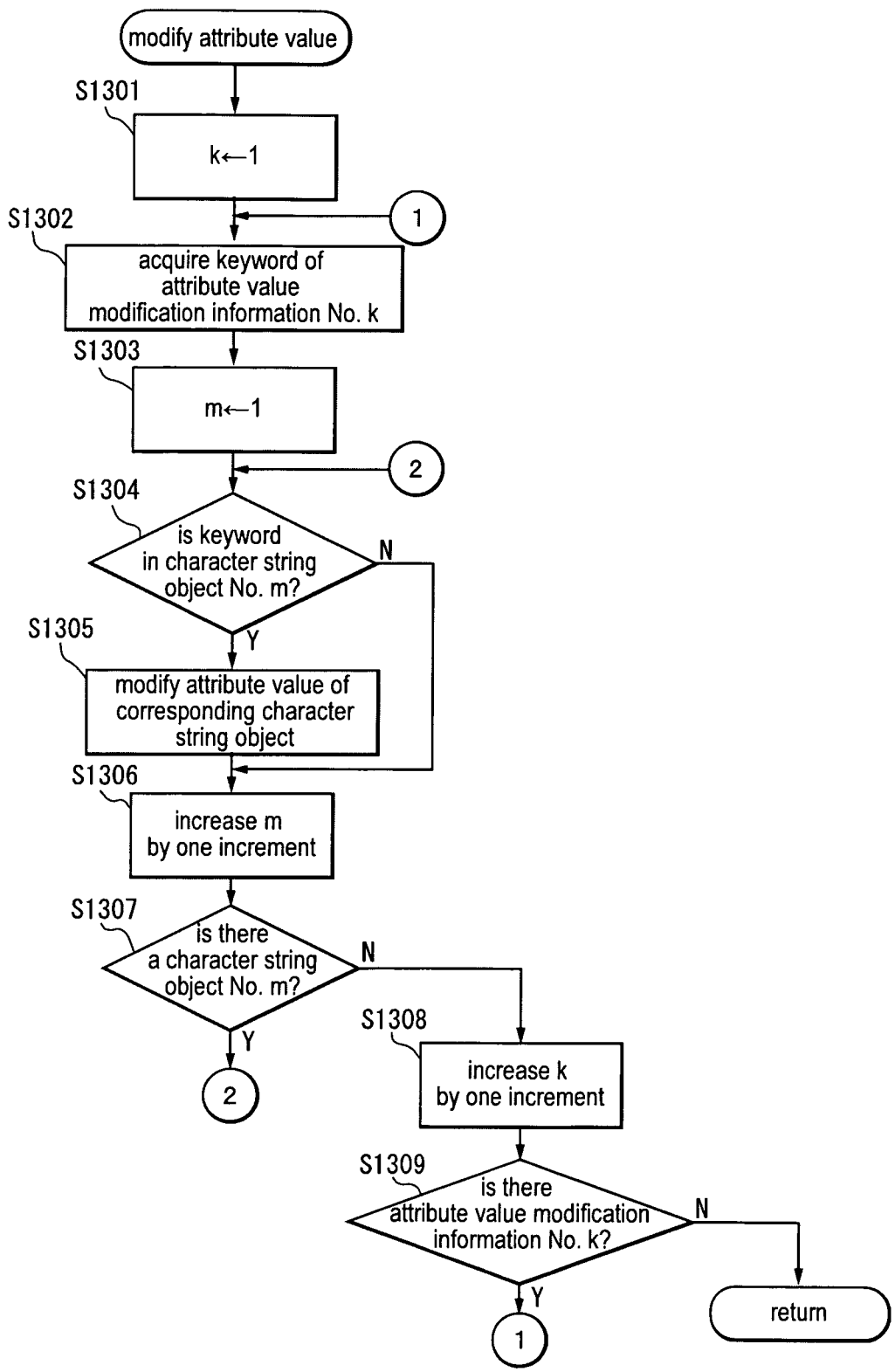
FIG. 13 is a flowchart that illustrates operation of the information editing device in FIG. 11.

Next is a description of details of the processing of Step S1201 in FIG. 12 with reference to the flowchart in FIG. 13.

(Step S1301) The judgment portion 22 substitutes 1 for a counter k.

(Step S1302) The judgment portion 22 acquires a keyword included in the attribute value modification information No. k among the attribute value modification information stored by the attribute value modification information storage portion 21.

(Step S1303) The judgment portion 22 substitutes 1 for a counter m.

(Step S1304) The judgment portion 22 judges whether or not the keyword acquired in Step S1302 is included in the character string object No. m. Specifically, the judgment portion 22 searches in the character string object for the keyword, and when there is a coinciding character string, judges that the keyword is included. When the keyword is included, the operation proceeds to Step S1305, and when the keyword is not included, the operation proceeds to Step S1306.

(Step S1305) The attribute value modification portion 23 modifies the attribute value of a character string object on a level that is a predetermined number of levels above the character string object No. m to an attribute value that becomes a pair with the keyword, i.e. an attribute value that is included in the attribute value modification information No. k. Then, the operation proceeds to Step S1306.

(Step S1306) The judgment portion 22 increases the counter m by one increment.

(Step S1307) The judgment portion 22 judges whether or not there is a character string object No. m. When there is, the operation proceeds to Step S1304, and when there is not, the operation proceeds to Step S1308.

(Step S1308) The judgment portion 22 increases the counter k by one increment.

(Step S1309) The judgment portion 22 judges whether or not there is an attribute value modification information No. k. When there is, the operation returns to Step S1302, and when there is not, the operation returns to a higher-ranked function.

Below is a description of the specific operation of the information editing device in the present embodiment. The conceptual diagram is the same as FIG. 3.

FIG. 14 shows the configuration of an object group stored in the object storage portion 11. This object group is the same as in FIG. 4 except that there is not a text object defined with a <product name> tag, a character string with the product name is stored in the <product information> tag, and the element in the <copy> tag is different, and so a detailed description is omitted here. Here, the character string object defined by the <product information> tag is defined with the default values of the character attribute values being such that the character thickness is standard, and the character size is 12 points.

FIG. 15 shows a placement area designation information management table for managing placement area designation information that is stored by the placement information storage portion 12. This placement area designation information management table is the same as in FIG. 5, and so a detailed description is omitted.

FIG. 16 shows an attribute value modification information management table for managing attribute value modification information that is stored by the attribute value modification information storage portion 21. The attribute value modification information management table includes attributes "modification ID", "keyword", and "attribute value". The "modification ID" is identification information for managing attribute value modification information. The "keyword" is a keyword used when searching for character string information that modifies an attribute value, and the "attribute value" is an attribute value applied to the character string object, wherein "font-style: italic" is an attribute value that modifies the form of characters to italic, "font-size: 18 pt" is an attribute value that sets the size of characters to 18 points, and "font-weight: bold is an attribute value that sets the characters to bold. Here, in order to simplify the description, the character attributes that are set for one character string object are not inherited by a character string object that is on a level below that character string object.

First, for example, in order to edit a product catalog, a user, using a menu or the like, gives an order to the information editing device 1 to open a screen in which the product catalog, in which objects have been placed, is edited.

The judgment portion 22 judges whether or not a keyword included in the attribute value modification information shown in FIG. 16 is included among the character string objects stored by the object storage portion 11 as shown in FIG. 14. Here, as shown in FIG. 16, the attribute value modification information includes the keywords "new product" and "limited", and a search is made for a character string object that includes those respective keywords. Here, a keyword 141 "limited" is detected in the character string object whose object ID is "007" and which is defined with the <copy> tag, and it is judged that the keyword is included.

Based on the results of this judgment, the attribute value modification portion 23, changes the attribute value of a character string object on a level that is a predetermined number of levels above this character string object whose object ID is "007" to the attribute value included in, among the attribute value modification information shown in FIG. 16, the attribute value modification information whose "modification ID" is "02" and that includes the keyword "limited". Here the level above is set in advance to a level that is one level above, and the information that sets this level is stored in a memory or the like. Thus, the character string object whose attribute value is subject to modification is the character string object whose ID is "002" and that is defined with the <product information>tag. Attribute modification for this character string object is performed by, for example, rewriting the opening tag <product information>, which is the tag that defines this character string, to a tag <product information ID=002 style="font-size:18 pt; font-weight:bold;">, in which information that expresses the attribute value included in the attribute value modification information whose "modification ID" is "02" has been added to the opening tag <product information>. In the tag, style="attribute value" indicates that the attribute value of the character string object defined with this tag is set to the attribute value within "attribute value". Also, here, the attribute value that is set with style="attribute value" is given priority over the default attribute value that was originally set in the tag. For example, as shown in FIG. 17, the character string object that is stored in the object storage portion 11 is overwritten by this character string object whose attribute value was modified by attribute value modification portion 23. A modification or the like of the attribute value may also be kept in a memory or the like without overwriting.

Figure 18:
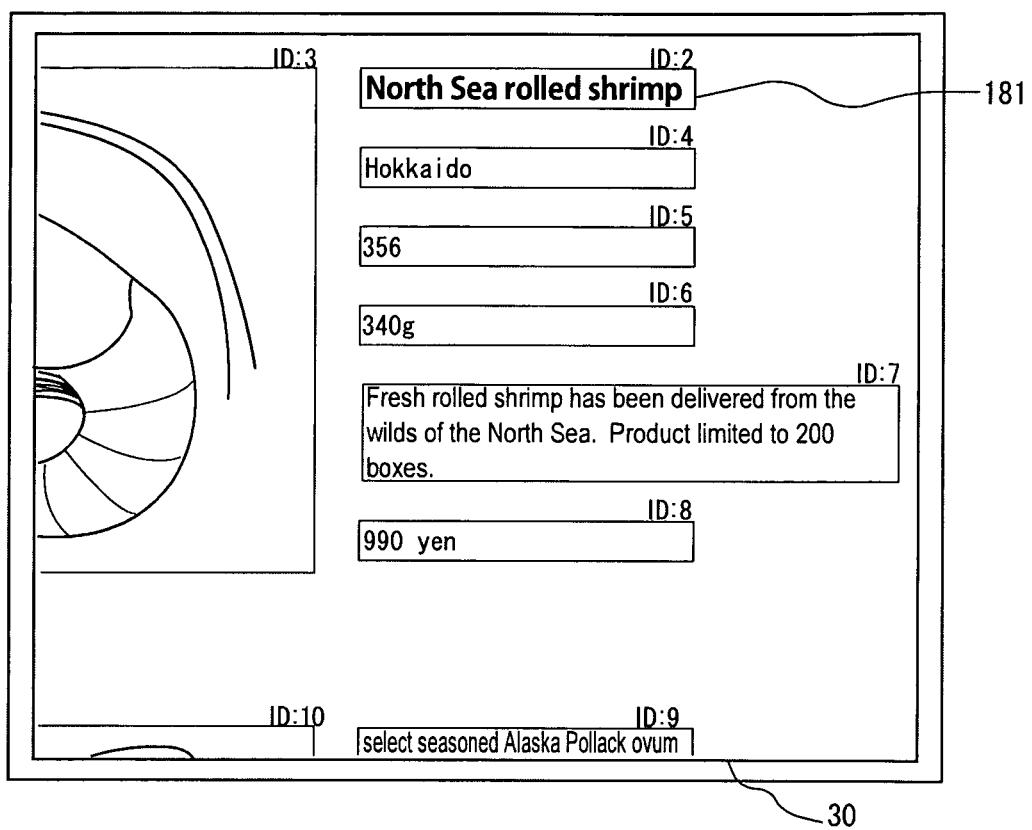
FIG. 18 shows an example of output of the information editing device in FIG. 11.

Based on the placement area designation information management table shown in FIG. 15, the object output portion 13 acquires, in order, from among the object group shown in FIG. 17, objects that have the same ID as the object ID of each set of placement area designation information, and places each object within a placement area that is set by the placement area designation information with which they respectively correspond. With respect to character string objects whose attribute value has been modified, these character string objects whose attribute value has been modified are acquired and placed. Then, the object output portion 13 outputs the placed character string objects. An example of output is shown in FIG. 18. In FIG. 18, an example of output is shown with a portion of the editing screen displayed enlarged. The character string "North Sea rolled shrimp" of the character string object whose ID is "002" is placed in a placement area 181 whose "area ID" is "2". The character size of the character string is 18 points, and the characters are bold.

Next, it is assumed that the user clicked with a pointer or the like inside the placement area whose "area ID" is "14", thus displaying a cursor for inputting characters, and input an addition to the character string from a keyboard or the like. It is assumed that the input character string was "This is a new product". The input receiving portion 14 receives this character string that was input.

The judgment portion 22 judges whether or not the keyword included in the attribute value modification information shown in FIG. 16 is included in the character string object whose ID is "014" and has been placed where the "area ID" is "14", and for which character input has been received. Here, the keyword "new product" is detected in the character string object defined with the <copy> tag, whose object ID is "014", among the object group shown in FIG. 17, so it is judged that the keyword is included.

Figure 19:
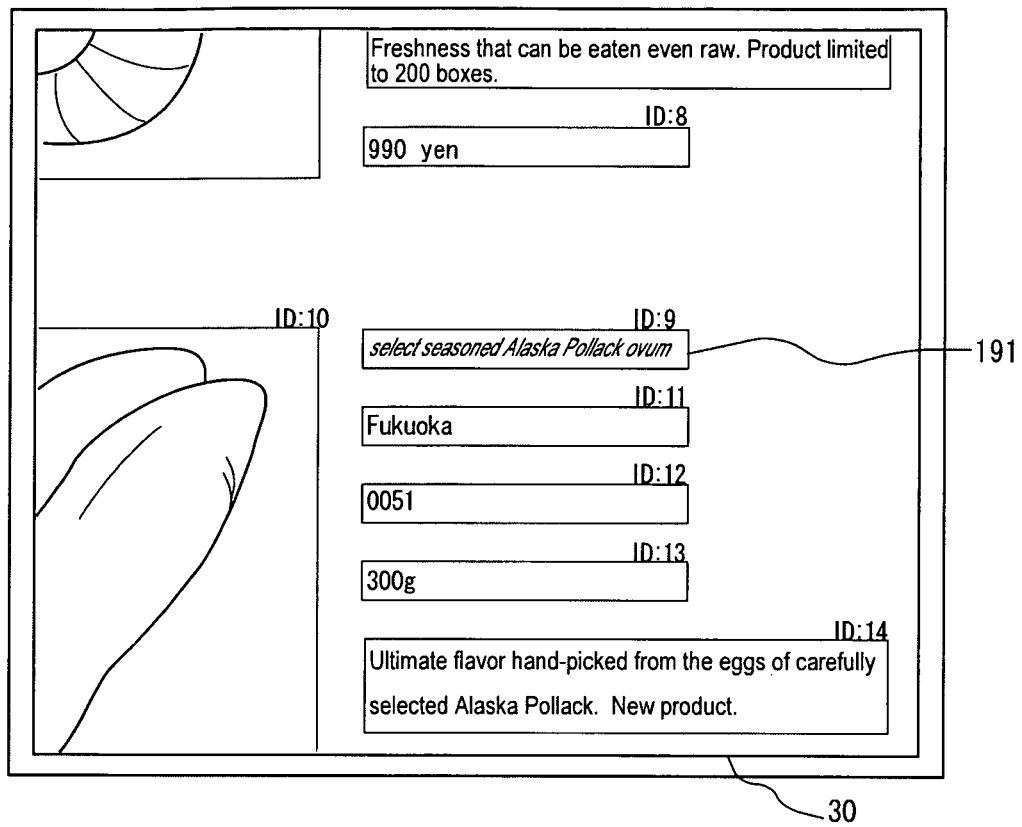
FIG. 19 shows an example of output of the information editing device in FIG. 11.

Based on the results of this judgment, the attribute value modification portion 23 changes the attribute value of a character string object on a level that is a predetermined number of levels above this character string object whose object ID is "014" to the attribute value included in, among the attribute value modification information shown in FIG. 16, the attribute value modification information whose "modification ID" is "01" and that includes the keyword "new product". Here the level above is set in advance to a level that is one level above. Thus, the character string object whose attribute value is subject to modification is the character string object whose ID is "009" and that is defined with the <product information>tag. Attribute modification for this character string object is performed by, for example, rewriting the opening tag <product information>, which is the tag that defines this character string, to a tag <product information ID=009 style="font-style:italic;">, in which information that expresses the attribute value included in the attribute value modification information whose "modification ID" is "01" has been added to the opening tag <product information>. The character string object that is stored in the object storage portion 11 is overwritten by this character string object whose attribute value was modified by the attribute value modification portion 23. An example of output of this character string object whose attribute value has been modified is shown in FIG. 19. The character string "select seasoned Alaska Pollack" of the character string object whose ID is "009" is placed in a placement area 191 whose "area ID" is "14", and the characters are italic.

Here, a configuration was adopted in which the attribute value of a character string object one level above the character string object that includes the keyword "new product" is modified, but in the present invention, a configuration may also be adopted in which the attribute value of a character string object that is on the same level as the character string object that includes the keyword "new product" and directly belongs to the character string object that is one level above the character string object that includes the keyword "new product", that is, a character string object whose object ID is 011 to 015, is modified. Also, supposing that there is a character string object that is one level below and directly belongs to the character string object that includes the keyword "new product", the attribute value of this character string object may be modified.

Other than the above, processing and the like that modifies the size or position of a placement area by modifying or deleting a character object is the same as in above Embodiment 1, and so it is omitted here.

Above, according to the present embodiment, according to a keyword included in a character string object, it is possible to modify an attribute value of a character string object on a level above the character string object that includes the keyword. Thus, it is possible to modify a character string object of a heading or the like that corresponds to that character string object depending on the content of the character string object, and display with emphasis, so that it is possible to effectively provide information. Also, according to the content of the character string object, it is possible to automatically modify a heading or the like of that character string object, so that processing in which a user investigates the content of the character string object is not necessary, and the processing load also is not increased.

The information editing device according to the present embodiment may be realized in a server-client system. In such a case, it is preferable to adopt a configuration in which the server device is provided with an object storage portion in which an object group is stored that includes two or more character string objects, hierarchized to have a tree structure, that can have a character string as data, an attribute value modification information storage portion in which one or more sets of a keyword that can be included in the character string object and attribute value modification information that is information included with an attribute value of a character string object, a judgment portion that judges whether or not the character string contained in the character string object includes the keyword, an attribute value modification portion that, when the judgment portion has judged that the keyword is included, modifies an attribute value of a character string object that has a predetermined corresponding relationship relative to the character string object including the keyword to an attribute value that becomes a pair with the keyword, and an object output portion that outputs the character string object.

Also, it is preferable that the client device is provided with a receiving portion that receives information or the like for outputting an object, sent via a network or the like by the object output portion or the like of the server device, and an output portion that performs output of the received information, for example display or the like.

Also, in each of the above embodiments, each constituent element may be configured from dedicated hardware, or alternatively, constituent elements that can be realized with software may be realized by executing a program. For example, each constituent element can be realized by a program execution portion of a CPU or the like reading and executing a software program that has been recorded on a recording medium such as a hard disk or semiconductor memory. The software that realizes the information editing device in each embodiment above is the below sort of program. That is, this program is a program for allowing a computer to execute a judgment step of judging whether or not a character string in two or more character string objects that can have a character string as data and are hierarchized to have a tree structure includes a predetermined keyword, an attribute value modification step of, when the judgment step has judged that the keyword is included, modifying an attribute value of a character string object that has a predetermined corresponding relationship relative to the character string object including the keyword to an attribute value that has been set in advance by being paired with the keyword, and an object output step of outputting the character string object.

Also, it goes without saying that in each of the above embodiments, two or more storage portions present in one device may be physically realized with one medium. This is also true in other embodiments.

Embodiment 3

In the information editing system in the present embodiment, the same device as the information editing device described in Embodiment 1 is used as a sever device, and in the client device, it is possible to edit a source of an object that is output in the server device, and the edited object can be output in the server device.

Figure 20:
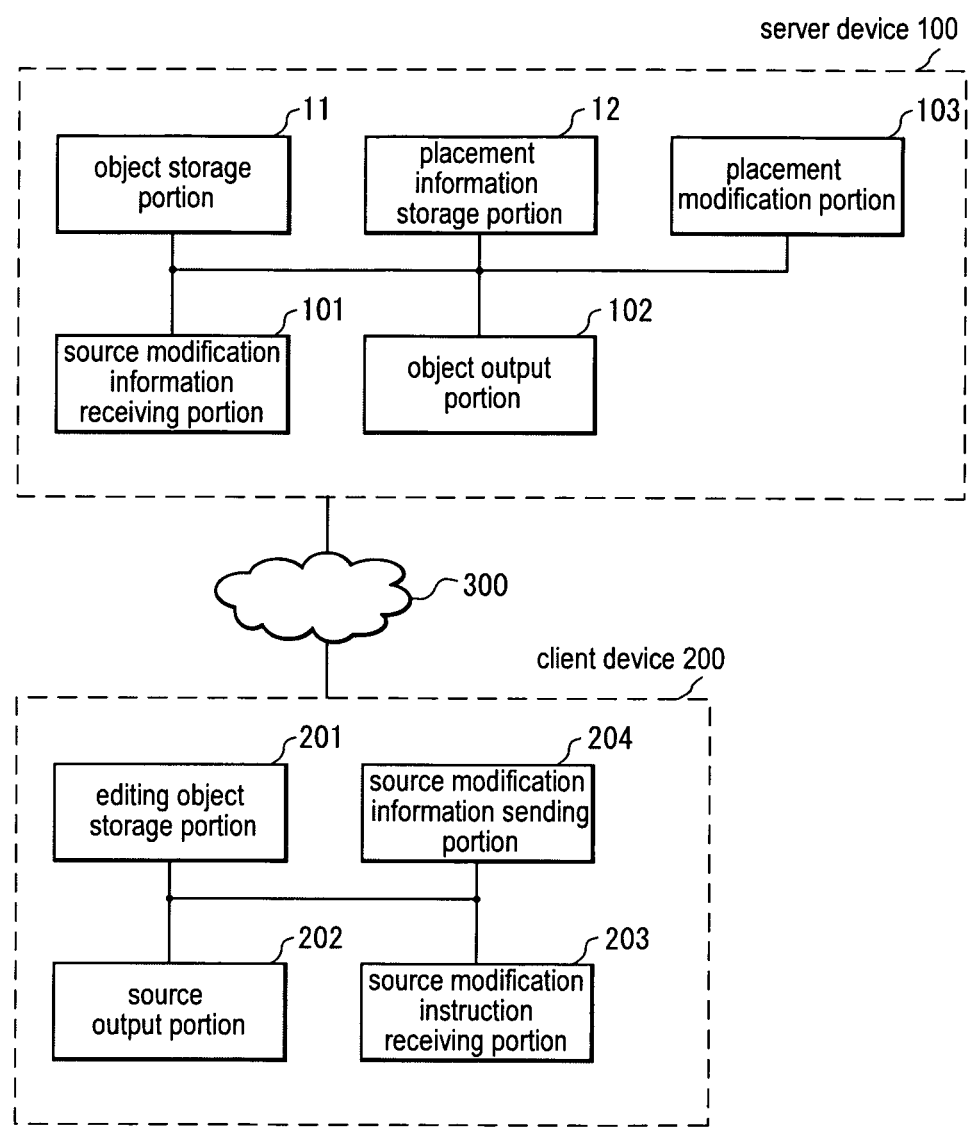
FIG. 20 is a block diagram of an information editing system in Embodiment 3.

FIG. 20 is a block diagram of the information editing system in the present embodiment.

The information editing system is provided with a server device 100 and a client device 200. The server device 100 and the client device 200 can send and receive information. The devices, for example, are connected to each other with a network 300 such as an internet, WAN, LAN, or the like. However, the method of sending and receiving information may be a communications method, or a broadcast method or the like.

The server 100 is provided with the object storage portion 11, the placement information storage portion 12, a source modification information receiving portion 101, an object output portion 102, and a placement modification portion 103.

The client device 200 is provided with an editing object storage portion 201, a source output portion 202, a source modification instruction receiving portion 203, and a source modification information sending portion 204.

The configuration of the object storage portion 11 and the placement information storage portion 12 in the server device 100 is the same as in Embodiment 1, and so their description is omitted.

The source modification information receiving portion 101 receives source modification information that is information for modifying the source of at least one object being output by the object output portion 102. The source of the object is the character string that constitutes the object. For example, when the object is constituted by an element between tags, the source of the object is the character string that constitutes the tags and the element. Source modification information is information for modifying the source of an object that is being output by the object output portion 102, and is later described in detail. The source modification information receiving portion 101 is ordinarily realized with a wireless or wired communications method, but it may also be realized with a method for receiving a broadcast.

The configuration of the object output portion 102 is the same as in Embodiment 1, other than modification (including deletion) being performed for an object that the object output portion 13 outputs based on source modification information described later, and so a detailed description thereof is omitted. Also, a modification of an object by the object output portion 102 based on the source modification information may be performed for information of an object that the object output portion 102 has read from the object storage portion 11 to a memory or the like, or it may be performed for information of an object that is stored in the object storage portion 11.

The configuration of the placement modification portion 103 is same as in Embodiment 1, other than modifying a placement area according to source modification information described later, and so a detailed description thereof is omitted. Modifying a placement area according to source modification information means, for example, modifying the size of a placement area such that an object that has been modified by the source modification information fits into a placement area, and, such that after modification the placement area does not overlap with another nearby placement area, modifying the position of another nearby placement area or the like. It also means, for example, deleting a placement area that corresponds to an object that has been deleted by the source modification information, and modifying the position of a placement area or the like that was set near this deleted placement area such that the area in which the deleted placement area was placed is closed up.

In the editing object storage portion 201, the same object as the object that is being output by the object output portion 102 can be stored. It is preferable that in the editing object storage portion 201, at least when the object output portion 102 has begun output of an object, the same object as the object that is being output is stored. It does not matter by what sort of method the same object as the object that is being output by the object output portion 102 is stored in the editing object storage portion 201. For example, the object that is being output by the object output portion 102 may be duplicated in the editing object storage portion 201 via a removable magnetic disk, optical disk, or the like. Also, when output of the object begins, the content of the object storage portion 11 and the editing object storage portion 201 may be synchronized over the network 300 via an unshown sending portion of the server device 100, a receiving portion of the client device 200, or the like. Likewise, a configuration may be adopted in which the object that is stored in the editing object storage portion 201 is forwarded in a file to the object storage portion 11 over the network 300, and the object that is output by the object output portion 102 is forwarded in a file to the object storage portion 11 over the network 300. The editing object storage portion 201 may be a nonvolatile recording medium or it may be a volatile recording medium.

The source output portion 202 outputs the source of the same object as, among the objects stored by the editing object storage portion 201, the object that is being output by the object output portion 102. Specifically, the source of the object can be output by executing an application such as a text editor that can edit the source, and opening the object. Here, opening the object means, for example, if the object is a file, opening that file and displaying the source. Also, if the object is a record in a database, it means displaying the source of that record. It does not matter how the source output portion 202 identifies and outputs the same object as the object that the object output portion 102 is outputting. For example, a configuration may be adopted in which the same identification number or the like is recorded for the same object, and when the source output portion 202 outputs the source of an object, the identification number for this object is sent to the server device 100 over the network 300, and the object output portion 102 identifies the object that has the same identification number as this identification number, or that has a corresponding identification number, and then outputs that object. Also, a configuration may be adopted in which, when the object output portion 102 outputs an object, the identification number for this object is sent to the client device 200 over the network 300, and the source output portion 202 identifies the source of the object that has the same identification number as this identification number, or that has a corresponding identification number, and then outputs that source. Also, an instruction such as a command or the like to output the same object may be input by the user to the server device 100 and the client device 200 respectively. The source output portion 202 may be considered to include an output device such as a display or it may be considered to not include an output device such as a display. The source output portion 202 can be realized with driver software of an output device, or with driver software of an output device and an output device or the like. Also, the source output portion 202 may be provided with an MPU, a memory, or the like that can execute application software that can display the source of an object, such as a so-called text editor. Output is a concept that includes display to a display, sending to an external device, or the like.

The source modification instruction receiving portion 203 receives a source modification instruction that is an instruction to modify the source for the source of the object that is being output by the source output portion 202. A source modification instruction, specifically, is an instruction to add or delete a character string to the source. Any method of inputting the source modification instruction may be used, such as a numeric keypad, a keyboard, a mouse, or a menu screen. The source modification instruction receiving portion 203 can be realized with a device driver of an input method such as a numeric keypad or keyboard, or control software or the like for a menu screen.

The modification of the source of an object based on a source modification instruction received by the source modification instruction receiving portion 203 may be performed on the source of an object that the source output portion 202 has read from the editing object storage portion 201 to a memory or the like. In this case, by an object in memory whose source has been modified, for example rewritten, based on this modification instruction, being output from the source output portion 202, the modification based on the source modification instruction is reflected in the output. Also, a modification (including deletion) of the source of an object based on a source modification instruction may be performed on the source of an object that is stored in the editing object storage portion 201. In this case, the object in the editing object storage portion 201 that has been modified based on this source modification instruction is read by the source output portion 202 every time, and by the source being output from the source output portion 202, the modification based on the source modification instruction is reflected in the output.

The source modification information sending portion 204 configures source modification information based on a source modification instruction, and sends it to the server device. The source modification information is information used in order to reflect modification of a source that has been performed by a source modification instruction in an object being output by the object output portion 102. The source modification information, for example, is information that includes information that indicates an added or deleted character string for the source of an object, and its location, and indicates the difference in the source of the object before and after modification. It may also be information that includes the source of an object obtained as a result of modification by a source modification instruction, and identification information for identifying that object. Also, data of an object being output by the source output portion 202, whose source has been modified by a source modification instruction, may be used as source modification information. Also, data of an entire group of objects being output by the source output portion 202 may be used as source modification information. Also, source modification information may include an instruction such as a command for modifying a source. For example, source modification information may be information in which a command that instructs modification and identifying information for an object that is subject to modification have been combined, specifically, it may be a "command + object ID". The source modification information sending portion 204 may configure source modification information and send source modification information to the server device 100 with any sort of timing or trigger. For example, a configuration may be adopted in which when a command to reflect a modification of a source in the client device 200 to the server device 100 has been received from a user, source modification information is configured, and sent to the server device 100. However, it is preferable that the modification of a source in the client device 200 is reflected in the output of the object output portion 102 of the server device 100 in real time, or with a time difference such that an impression near real time is given to the user. In order to do so, it is preferable that, for example, when the source modification instruction receiving portion 203 has received a source modification instruction, the source modification information sending portion 204 configures source modification information and sends that source modification information. Specifically, a configuration may be adopted in which, for example, reception of input of characters or input of a predetermined number of character strings by the source modification instruction receiving portion 203 acts as a trigger, and then the source modification information sending portion 204 configures source modification information and sends that source modification information. Also, a configuration may be adopted in which, for example, reception of input of a predetermined key or command, for example such as an "enter" key, a "delete" key, an "input confirmation" command, or a "delete" command by the source modification instruction receiving portion 203 acts as a trigger, and then the source modification information sending portion 204 configures source modification information and sends that source modification information. Also, for example, a configuration may be adopted in which the source modification information sending portion 204 acquires a source modification instruction from the source modification instruction receiving portion 203 at regular or irregular predetermined time intervals, and then the source modification information sending portion 204 configures source modification information and sends that source modification information. In this case, a configuration may be adopted in which when the source modification instruction receiving portion 203 has not received a new source modification instruction, a source modification instruction is not acquired, or in which a source modification instruction is always acquired. Also, it is preferable that the predetermined time interval is short, in order for the modification of a source in the client device 200 to be reflected in real time. The source modification information sending portion 204 can be realized with a wireless or a wired communications method or the like. Ordinarily, the source modification information sending portion 204 is realized with a wireless or a wired communications method, but it may also be realized with a broadcast method. Also, the method for the source modification information sending portion 204 to configure source modification information can ordinarily be realized from an MPU, a memory, or the like. The processing procedure in which the source modification information sending portion 204 configures source modification information is ordinarily realized with software, and the software is recorded on a recording medium such as a ROM. However, this processing procedure may also be realized with hardware (a dedicated circuit).

Next, the operation of the server device 100 of the information editing system will be described with reference to the flowchart in FIG. 21. The same reference numerals as in FIG. 2 indicate the same or corresponding steps, and so they are omitted here. However, in FIG. 21, the processing and the like executed by the object output portion 13 and the placement modification portion 15 in FIG. 2 is executed by the object output portion 102 and the placement modification portion 103, respectively.

(Step S2101) The object output portion 102 judges whether or not to output one or more objects. The object output portion 102 may judge whether or not to output an object in any manner. For example, a configuration may be adopted in which the object output portion 102 judges whether or not an unshown receiving portion or the like has received from a user or the like an instruction to output an object, information that indicates that information will be edited in the client device 200 or the like, or the like, and when such has been received, the object output portion 102 judges that an object will be output. Also, the object output portion 102 may judge whether or not an object will be output based on an instruction from another processing portion or the like. When an object will be output, the operation proceeds to Step S2102, and when an object will not be output, the operation returns to Step S2101.

(Step S2102) The object output portion 102 outputs one or more objects. Specifically, based on placement area designation information that is stored in the placement information storage portion 12, the object output portion 102 acquires an object that corresponds to each placement area set by the placement area designation information from the object storage portion 11, and outputs this object by placing it in a placement area set by the placement area designation information that corresponds to this object. The placement of the object within the placement area in the vertical or horizontal directions, for example such as left alignment, centered alignment, top alignment, bottom alignment, or the like, does not matter. Also, the object output portion 102 may output all of the objects that are stored in the object storage portion 11, or it may output only some of the objects, for example, an object that has been designated by a user or the like, or an object for which there is corresponding placement area designation information.

(Step S2103) The source modification information receiving portion 101 judges whether or not source modification information has been received. When source modification information has been received, the operation proceeds to Step S2104, and when source information has not been received, the operation returns to Step S2103.

(Step S2104) Based on source modification information received in Step S2103, the object output portion 102 modifies the source of an object that is being output. Specifically, the object output portion 102 may modify the source of an object that has been read to a memory or the like in order to perform output. Also, for example, a configuration may be adopted in which, when update of output by the object output portion 102 is performed by reading an object that is stored in the object storage portion 11 every time update is performed, the object output portion 102 modifies the source of the object that is stored in the object storage portion 11.

(Step S2105) The placement modification portion 103 judges whether or not an object has been deleted by the modification of the source in Step S2104. For example, the placement modification portion 103 may judge a deleted object by comparing the source of each object before and after modification. Specifically, when one piece of identification information that has been added to each object has disappeared after modification, the placement modification portion 103 may judge that the object to which this identifying information was added has been deleted. Also, for example, when each object after modification and the placement area designation information acquired in Step S2102 are compared, and an object corresponding to a placement area designated by the placement area designation information is not among the objects after modification, the placement modification portion 103 may judge that this object has been deleted. When an object has not been deleted, the operation proceeds to Step S2106, and when an object has been deleted, the operation proceeds to Step S212.

(Step S2106) The placement modification portion 103 judges whether or not, for an object that has been modified by the modification of the source in Step S2104, the object after modification fits within the placement area in which this object is placed. Specifically, the placement modification portion 103 obtains the size of the object modified based on the modification instruction, and compares that size to the size of the placement area in which this object is placed. The size of the placement area is obtained from the placement area designation information, or calculated based on information acquired from the placement area designation information. If the size of the object after modification is larger than the size of the placement area, the placement modification portion 103 judges that the object does not fit, and if the size of the object after modification is not larger than the size of the placement area, the placement modification portion 103 judges that the object does fit. When the object fits, the operation proceeds to Step S205, and when the object does not fit, the operation proceeds to Step S206.

Figure 21:
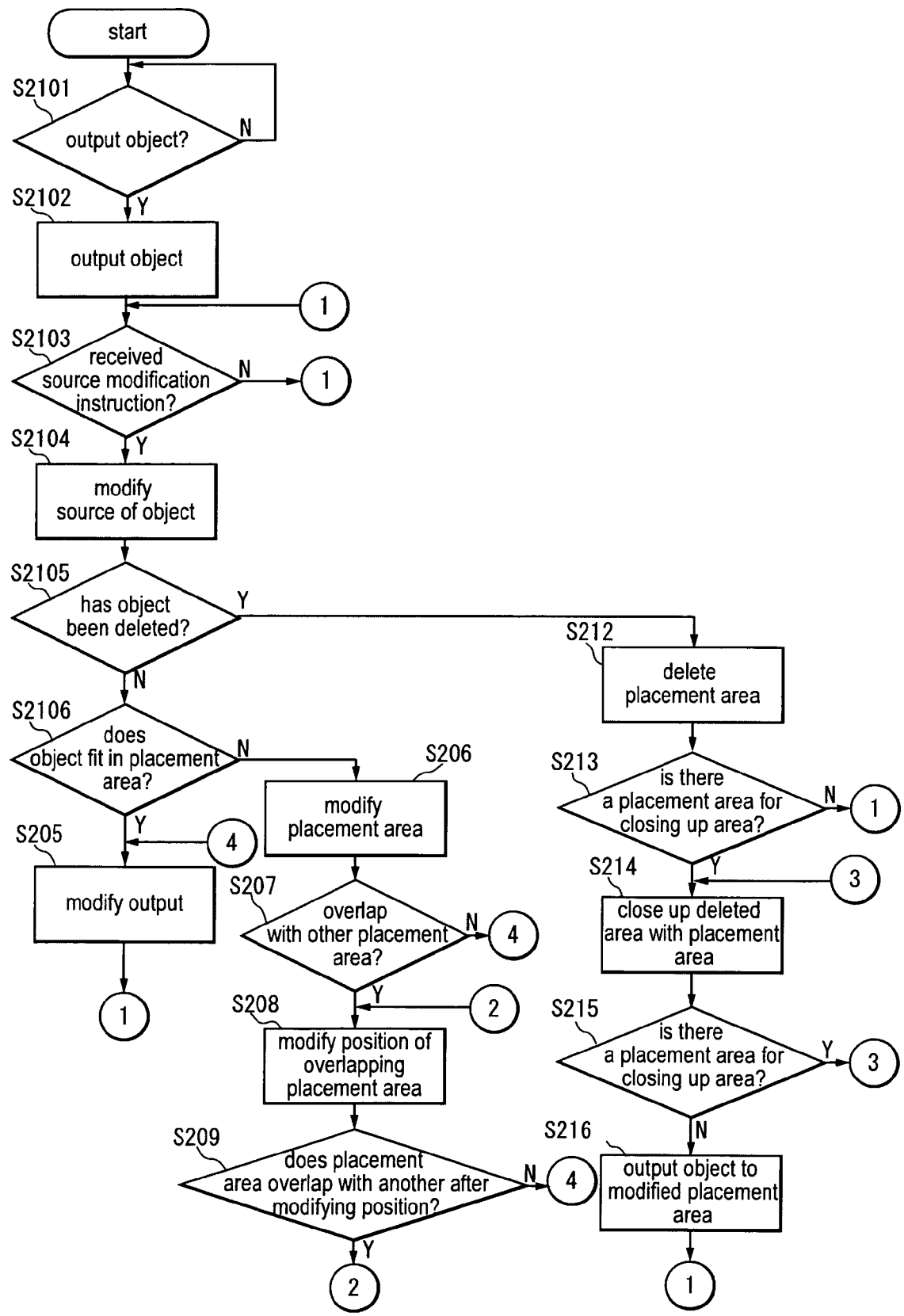
FIG. 21 is a flowchart that illustrates operation of a server device of the information editing system in FIG. 20.

In the flowchart in FIG. 21, processing is ended by turning off power or a processing-ending interruption.

Figure 22:
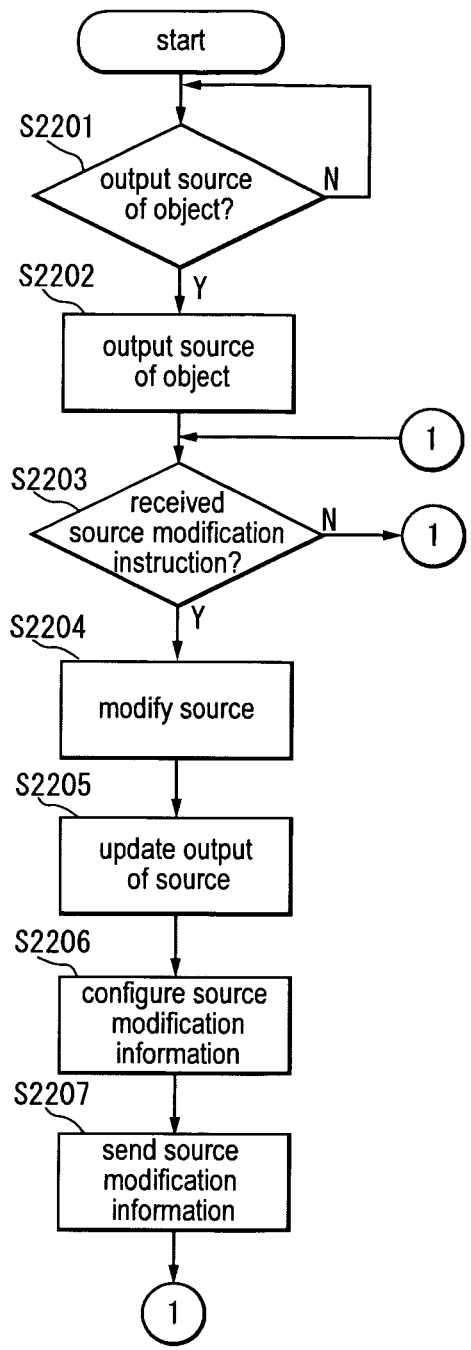
FIG. 22 is a flowchart that illustrates operation of a client device of the information editing system in FIG. 20.

Next is a description of operation of the client device 200 with reference to the flowchart in FIG. 22.

(Step S2201) The source output portion 202 judges whether or not the source of one or more objects will be output. The source output portion 202 may judge whether or not the source of an object will be output in any manner. For example, a configuration may be adopted in which the source output portion 202 judges whether or not an unshown receiving portion or the like has received from a user or the like an instruction to output the source of an object, information from the server device 100 or the like that indicates editing of the object, or the like, and when such has been received, the source output portion 202 judges that the source of an object will be output. Also, the source output portion 202 may judge whether or not the source of an object will be output based on an instruction from another processing portion or the like. When the source of an object will be output, the operation proceeds to Step S2202, and when the source of an object will not be output, the operation returns to Step S2201.

(Step S2202) The source output portion 202 outputs the source of one or more objects. Specifically, the source output portion 202 acquires an object that is stored in the editing object storage portion 201, and outputs the source of this object. Attributes such as the font of the character string when outputting the source do not matter. Also, the source output portion 202 may output the source of all of the objects that are stored in the editing object storage portion 201, or it may output the source of only some of the objects, for example, an object that has been designated by a user or the like, or an object for which there is corresponding placement area designation information.

(Step S2203) The source modification instruction receiving portion 203 judges whether or not a source modification instruction has been received. If a source modification instruction has been received, the operation proceeds to Step S2204, and if a source modification instruction has not been received, the operation returns to Step S2203.

(Step S2204) Based on the source modification instruction received in Step S2203, the source output portion 202 modifies the source of an object that is being output. For example, if the source modification instruction is an instruction to add the character string, the added character string is added to the source. Also, if the source modification instruction is an instruction to delete a desired character string of the source, this character string is deleted. The source output portion 202 may also modify the source of an object that has been read to a memory or the like in order to perform output. Also, for example, a configuration may be adopted in which, when update of output of the source by the source output portion 202 is performed by reading an object that is stored in the editing object storage portion 201 every time update is performed, the source output portion 202 modifies the source of the object that is stored in the editing object storage portion 201.

(Step S2205) The source output portion 202 updates output of the source. Specifically, the source output portion 202 rewrites the source that is presently being output with the source of the object that was modified in Step S2204, and outputs that rewritten source.

(Step S2206) The source modification information sending portion 204 configures source modification information based on the source modification instruction received in Step S2203. Step S2206 may also be processing prior to Step S2204 and Step S2205.

(Step S2207) The source modification information sending portion 204 sends the source modification information configured in the Step S2206 to the server device 100. Then the operation returns to Step S2203.

In the flowchart in FIG. 22, processing is ended by turning off power or a processing-ending interruption.

Figure 23:
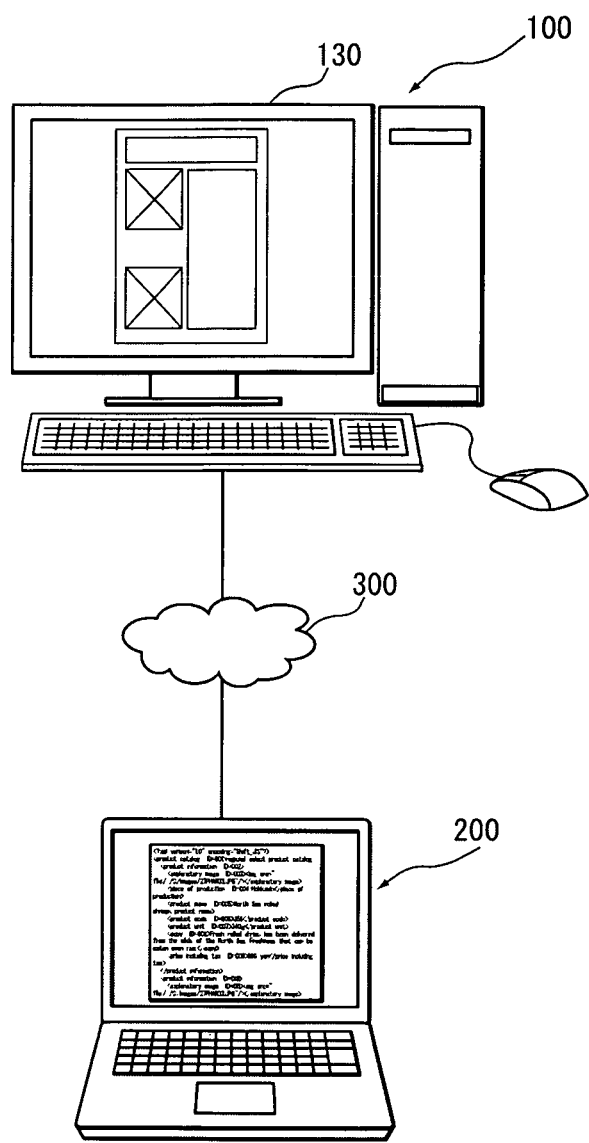
FIG. 23 is a conceptual diagram of the information editing system in FIG. 20.

Following is a description of the specific operation of the information editing system in the present embodiment. FIG. 23 is a conceptual diagram of the information editing system. Here a case is described in which the object output portion 102 includes a display 130 as a display device, and the source output portion 202 includes a display 230 as a display device. Also, an XML file like that shown in FIG. 4 is stored as an object group in the object storage portion 11 and the editing object storage portion 201 respectively, and the placement area designation information that is stored in the placement information storage portion 12 is managed with a placement area designation information management table as shown in FIG. 5. The title of the XML file like that in FIG. 4 is "list.xml".

Here, for example, with the client device 200, the source of the object group is edited, and the results of that editing are output and confirmed in the server device 100 that has been connected with the network 300.

First, the user of the client device 200 gives an instruction to the client device 200 using a menu or the like to open the source of the file "list.xml" like the XML file shown in FIG. 4, stored in the editing object storage portion 201.

Also, at approximately the same time, the user of the server device 100 also gives an instruction to the server device 100 using a menu or the like to open the file "list.xml", which is the same as a file opened in the client device 200 and stored in the object storage portion 11, by placing it in the placement area.

Figure 24:
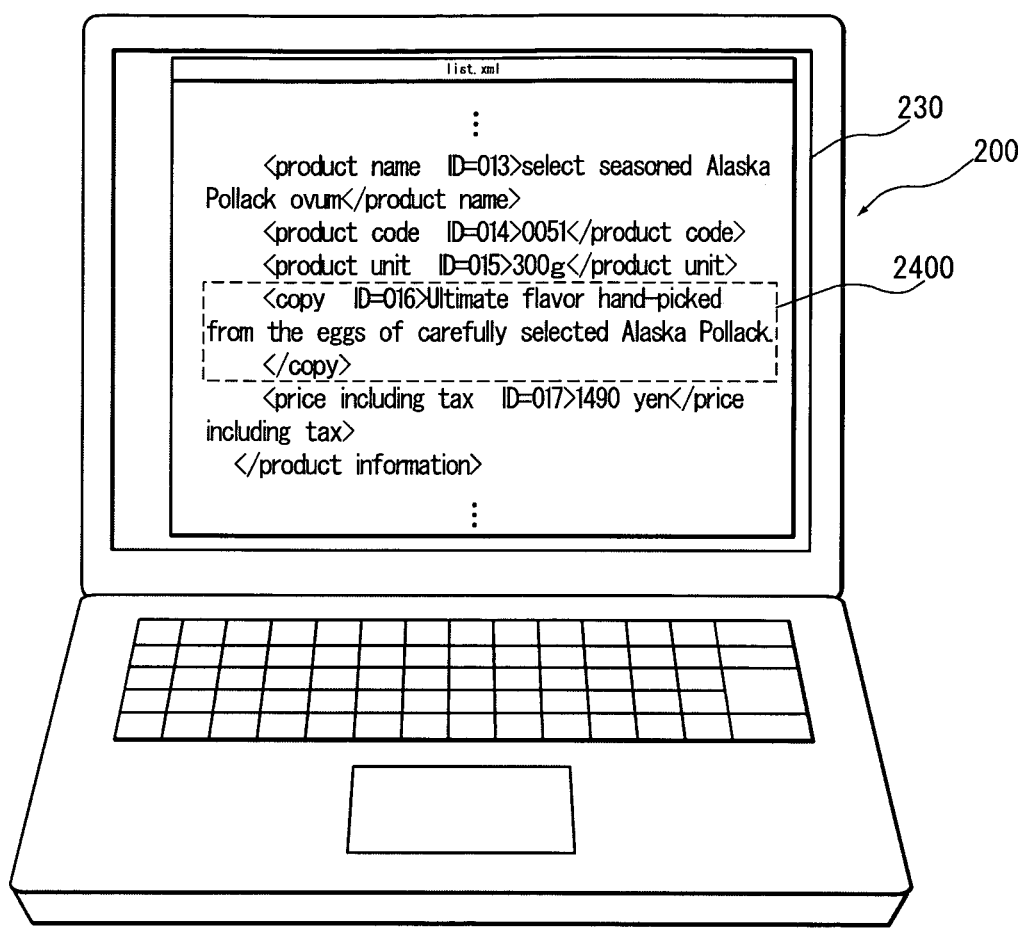
FIG. 24 shows an example of output of a client device of the information editing system in FIG. 20.

The source output portion 202 reads the XML file shown in FIG. 4 from the editing object storage portion 201, and outputs its source to the display 230 using an editor or the like that can edit text. An example of that output is shown in FIG. 24.

Also, in the server device 100 as well, same as in above Embodiment 1, as shown in FIG. 6, the objects that constitute the XML file "list.xml" are output by being placed in the placement areas that are designated by the placement area designation information.

Figure 25:
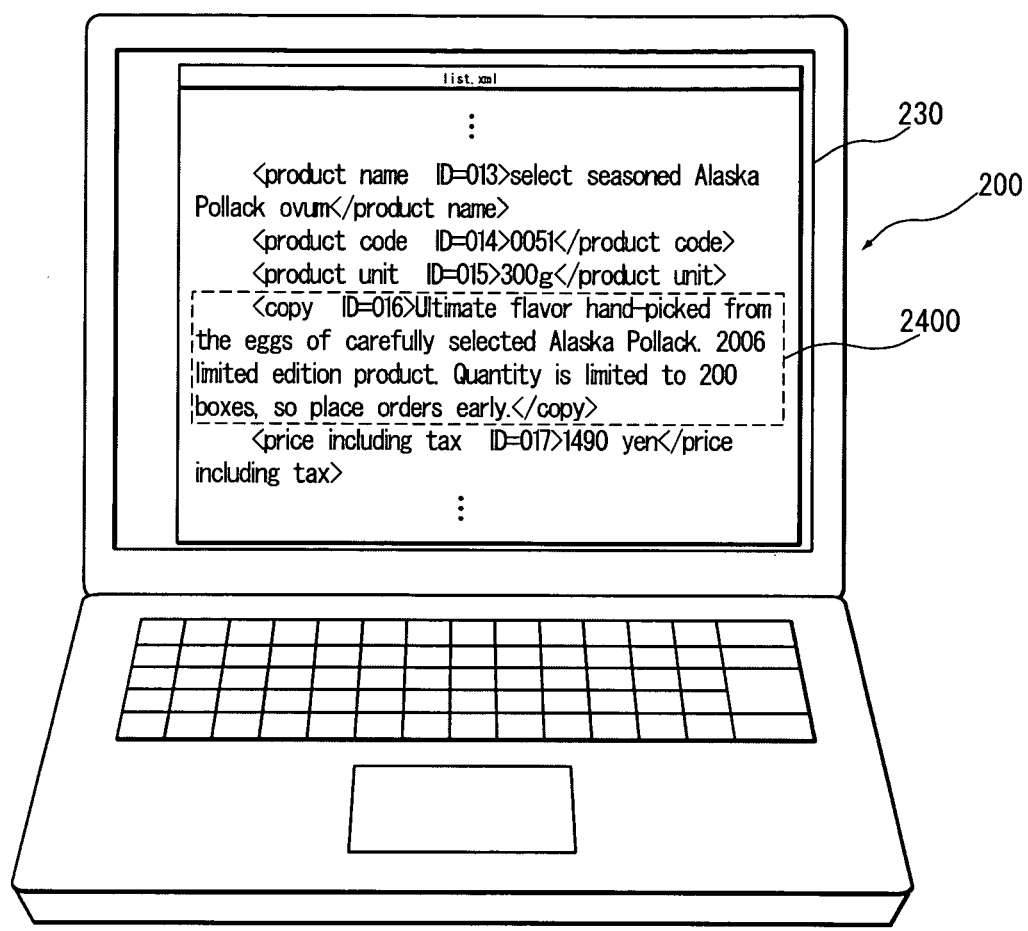
FIG. 25 shows an example of output of a client device of the information editing system in FIG. 20.

Next, the user of the client device 200, using a keyboard or the like, inputs the character string "2006 limited edition product. Quantity is limited to 200 boxes, so place orders early." at the tail end of the element "Ultimate flavor of . . . carefully selected Ak. Pollack." of the source "<copy ID=016>Ultimate flavor of . . . carefully selected Ak. Pollack.</copy>" of the object 2400 whose object ID is "016" in the source of the file "list.xml" being output by the source output portion 202, and then, for example, presses an "enter" key of the keyboard. Thus, the source modification instruction receiving portion 203 receives a source modification instruction to add the character string "2006 limited edition product. Quantity is limited to 200 boxes, so place orders early." to the source of the object 2400. With this source modification instruction, the source of this object is modified to "<copy ID=016> Ultimate flavor of . . . carefully selected Alaska. Pollack. 2006 limited edition product. Quantity is limited to 200 boxes, so place orders early.</copy>", and the modified source is displayed in the display 230 as shown in FIG. 25.

Figure 26:
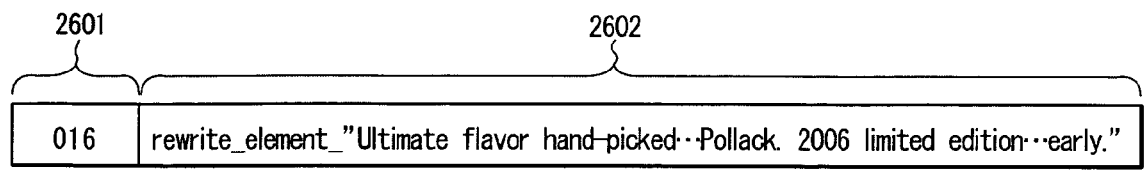
FIG. 26 shows an example of source modified information of the information editing system in FIG. 20.

Next, the source modification information sending portion 204, triggered by receiving the above source modification instruction, based on this source modification instruction, configures source modification information in order to modify the element of the object whose ID is "016" to "Ultimate flavor of . . . carefully selected Ak. Pollack. 2006 limited edition product. Quantity is limited to 200 boxes, so place orders early." An example of the configuration of this source modification information is shown in FIG. 26. In FIG. 26, the source modification information is configured from an object ID 2601 for designating the object to be modified, and a command 2602 that instructs modification of that object. Here, as a command, a command "rewrite_element_" Ultimate flavor of . . . carefully selected Alaska Pollack. 2006 limited edition product. Quantity is limited to 200 boxes, so place orders early."", which is a command for rewriting the element of the object to "Ultimate flavor of . . . carefully selected Alaska Pollack. 2006 limited edition product. Quantity is limited to 200 boxes, so place orders early." is stored.

The source modification information sending portion 204 sends this configured source modification information to the server device 100. A network address such as an IP address of the server device 100 is held in advance in the client device 200.

When the source modification information receiving portion 101 of the server device 100 receives the source modification information shown in FIG. 26, the object output portion 102, from among the object group that is being output by the object output portion 102, detects the object whose object ID is the same as the object ID 2601 included in the source modification information, and executes the command 2602 included in the source modification information for the source of that object. Specifically, the object output portion 102 searches in the object group as shown in FIG. 4 for an opening tag that includes "ID=016". Then, based on the command included in the source modification information for the object defined with this tag, that is, the object "<copy ID=016> Ultimate flavor of . . . carefully selected Alaska Pollack. </copy>", the object output portion 102 executes processing that rewrites the element of the object to "Ultimate flavor of . . . carefully selected Alaska Pollack. 2006 limited edition product. Quantity is limited to 200 boxes, so place orders early." As a result, same as in FIG. 8, information for the object whose object ID is "016" and is output to the area whose area ID is "14" is modified to "Ultimate flavor of . . . carefully selected Alaska Pollack. 2006 limited edition product. Quantity is limited to 200 boxes, so place orders early."

At this time, as a result of the object being modified based on the source modification information, the object no longer fits within the placement area whose area ID is "14", and so the size of the placement area whose area ID is "14" is modified, and the position of other placement areas are modified accordingly. This processing is the same as in above Embodiment 1, and so a description thereof is omitted here.

Figure 27:
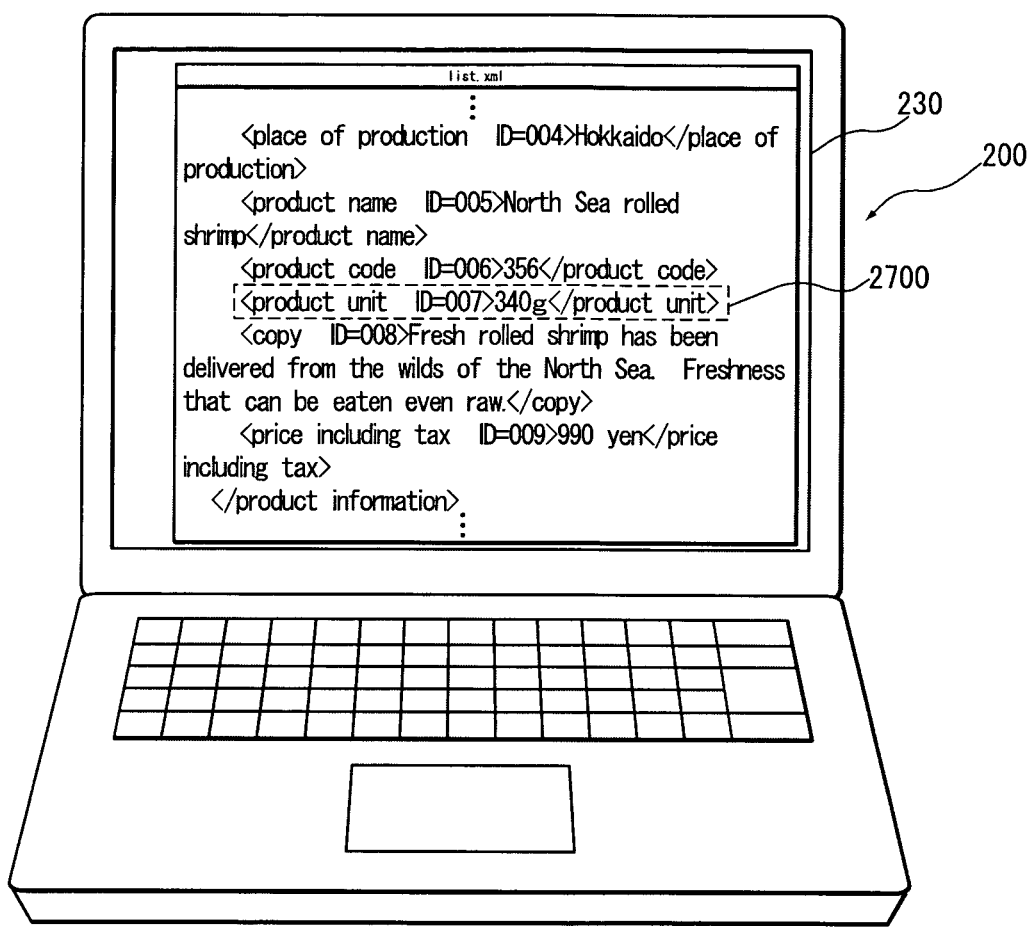
FIG. 27 shows an example of output of a client device of the information editing system in FIG. 20.
Figure 28:
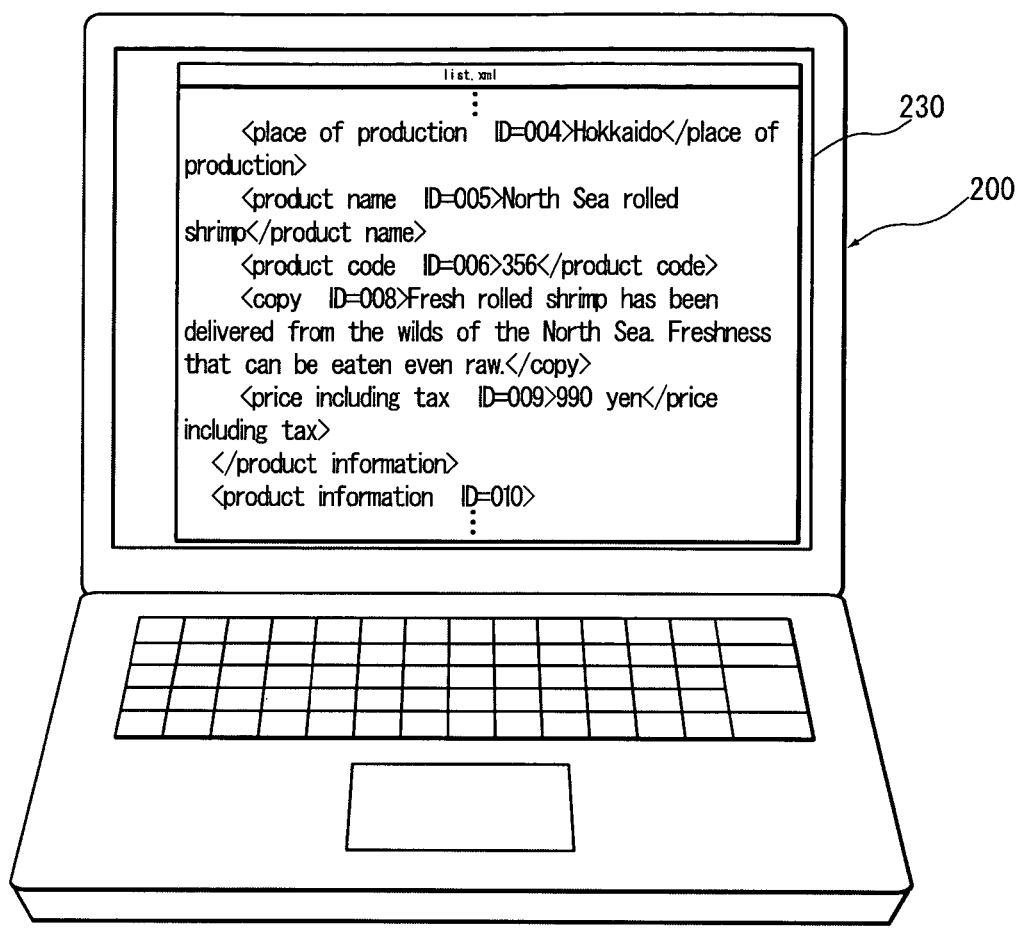
FIG. 28 shows an example of output of a client device of the information editing system in FIG. 20.

Next, the user of the client device 200, as shown in FIG. 27, using a mouse, keyboard, or the like, selects the source "<product unit ID=007>340 g</product unit>" of the object 2700 whose object ID is (007) in the source of the file "list.xml" that is being output by the source output portion 202, and presses a "delete" key. Thus, the source modification instruction receiving portion 203 receives a source modification instruction that deletes the source of this object 2700. The source of the object 2700 is deleted by the source modification instruction, and the modified source is displayed on the display 230 as shown in FIG. 28.

Figure 29:
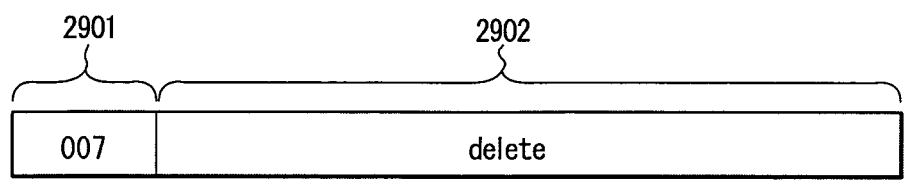
FIG. 29 shows an example of source modified information of the information editing system in FIG. 20.

Next, the source modification information sending portion 204, triggered by receiving the above source modification instruction, configures source modification information for deleting the object whose ID is "007" based on this source modification instruction. An example of the configuration of this source modification information is shown in FIG. 29. In FIG. 29, the source modification information is configured from an object ID 2901 for designating the object to be modified, and a command 2902 that instructs modification of that object. Here, as a command, a "delete" command to delete the object is stored.

The source modification information sending portion 204 sends this configured source modification information to the server device 100.

When the source modification information receiving portion 101 of the server device 100 receives the source modification information shown in FIG. 29, the object output portion 102, from among the object group that is being output by the object output portion 102, detects the object whose object ID is the same as the object ID 2901 included in the source modification information, and executes the command 2902 included in the source modification information for the source of that object. Specifically, the object output portion 102 searches in the object group as shown in FIG. 4 for an opening tag that includes "ID=007". Then, the object output portion 102 executes processing that deletes the object defined with this tag, that is, the object "<product unit ID=007>340 g</product unit>". As a result, same as in FIG. 10, the area whose area ID is "6" is deleted from the output of the object output portion 102.

Processing and the like that closes up other placement areas in response to this sort of deletion of an object based on source modification information is the same as in above Embodiment 1, so a description thereof is omitted here.

Above, according to the present embodiment, when an object no longer fits inside a placement area due to modification of the object in the placement area, the placement area is enlarged, and further, when the placement area overlaps another placement area due to the placement area being enlarged, by shifting the position of the overlapped other placement area it is possible to output all of the object that no longer fit in the placement area. Further, even when the placement area has been enlarged, with respect to the other area that overlaps with this placement area, by modifying the placement area such that it does not overlap with this placement area, it is possible to prevent the enlargement from becoming an obstacle for output of an object into the other placement area.

Also, when the object in the placement area has been deleted, the placement area of this deleted object is also deleted, and further the area in which there is not a placement area, generated by deletion of this placement area, is closed up with a nearby placement area, reducing wasted or unnecessary space, so that it is possible to provide information with excellent communicability of information.

Further, it is possible to perform output after reflecting modification of the source of an object by the client device 200, over a network, in the placement or the like of each object in the server device 100. Thus, for example, it is possible to collaboratively perform editing work between different locations.

Also, it is sufficient that modification of the source of an object can be performed on the client device 200 side, because placement of an object based on placement information is not performed in the client device 200, and therefore, high processing ability is not required for the client device 200; it is fine if the client device 200 can perform enough processing that it is possible to edit text or the source of XML files. As a result, equipment with high portability, such as a notebook computer with comparatively low processing ability, can be adequately used as the client device 200. As a result, with a wealth of portability, it is possible to perform editing work without choosing a location.

Also, because a modification that has been made in the client device 200 is quickly reflected in the placement of the object in the server device 100, a large time difference or waiting time between editing of the source of an object and confirmation of the result of editing does not occur, and it is possible to achieve an acceleration of editing work.

In the specific example above, a case was described in which the object storage portion 11 and the editing object storage portion 201 store, in advance, the same object as the object output by the object output portion 102. However, in the present application, a configuration may also be adopted in which only the object storage portion 11 stores an object in advance, and when for example editing the object, the object that is output by the object output portion 102 is sent to the client device 200.

Figure 30:
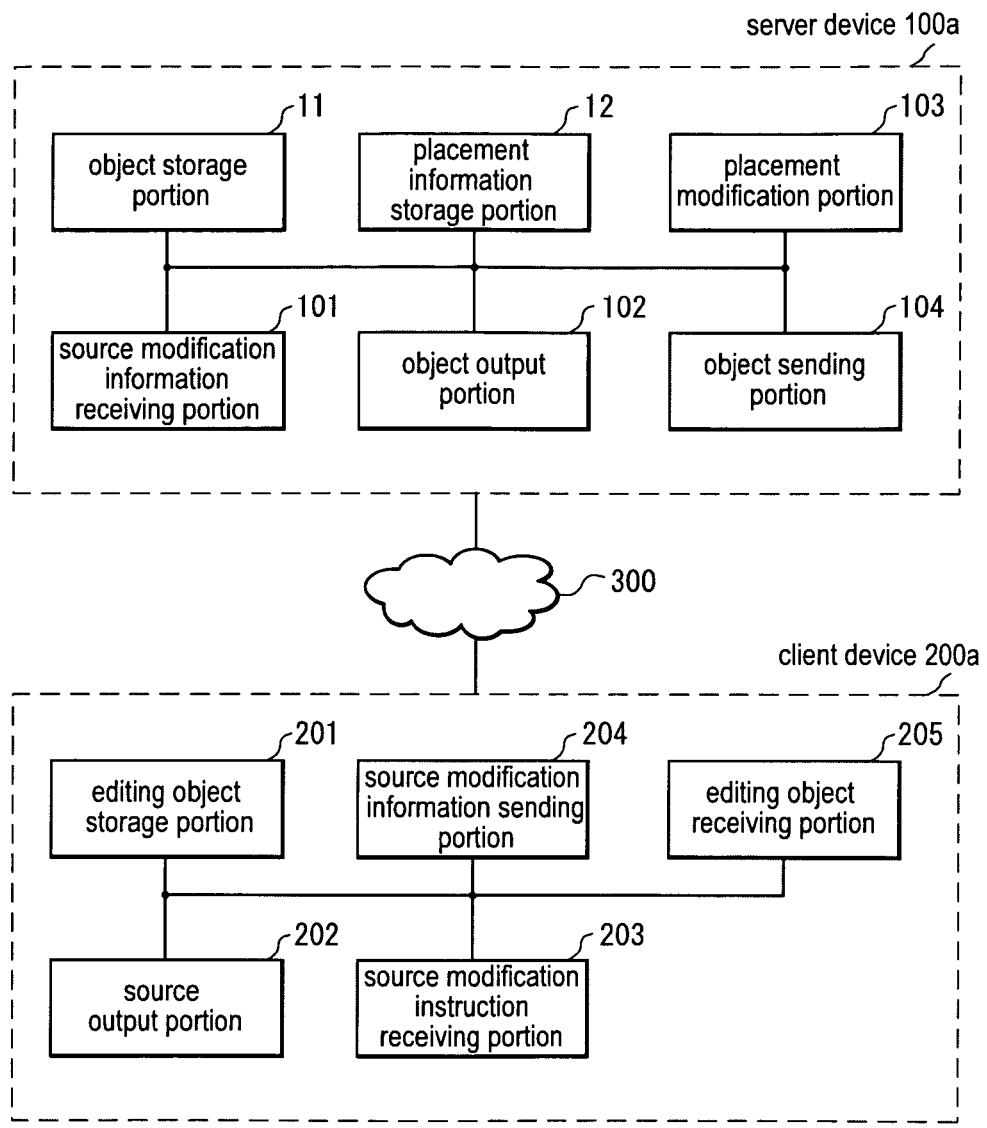
FIG. 30 shows a modified example of the information editing system in FIG. 20.

FIG. 30 shows a modified example of the information editing system of the present embodiment, provided with such a configuration for sending an object from a server device. In this modified example, in the information editing system shown in FIG. 20, rather than the server device 100a server device 100a that further includes an object sending portion 104 is provided, and rather than the client device 200a server device 200a that further includes an editing object receiving portion 205 is provided.

The object sending portion 104 sends the object output by the object output portion 102 to the client device 200. The object sending portion 104 may send the object output by the object output portion 102 after acquiring it from the object storage portion 11, or it may acquire and send an object read to a memory or the like from the object storage portion 11 when the object output portion 102 performs output. The timing or trigger with which the object sending portion 104 acquires and sends an object does not matter. Sending of the object to be output may be triggered by output of the object by the object output portion 102. Also, a configuration may be adopted in which when a request to send an object has been received from the client device 200a, the object for which a request was received is sent, or a configuration may be adopted in which when a send instruction has been received from a user, the object for which a send instruction was received is sent. However, it is preferable that at least, an object is acquired and sent when the object output portion 102 starts to output an object. Also, even in a case in which after the object output portion 102 has started to output an object, a modification has been added or a deletion has been performed for the object output by the object output portion 102, the object sending portion 104 may acquire and send the modified object. The object sending portion 104 can be realized with a wireless or wired communications method or the like.

The editing object receiving portion 205 receives an object sent from the server device 100, and holds it in the editing object storage portion 201. The editing object receiving portion 205 is ordinarily realized with a wireless or wired communications method, but it may also be realized with a method for receiving a broadcast. Also, the processing procedure for holding the received object is ordinarily realized with software, and the software is recorded on a recording medium such as a ROM. However, the processing procedure may also be realized with hardware (a dedicated circuit). The editing object receiving portion 205 may be provided with, for example, an MPU, a memory, or the like for executing this processing that holds the received object.

In this sort of configuration, for example, when an unshown receiving portion of the server device 100a receives an instruction to output an object that is stored in the object storage portion 11 in order to edit a desired object in the server device 100a, this desired object, or alternatively an object group that includes this object, is sent from the object sending portion 104 to the client device 200a.

In the client device 200a, the editing object receiving portion 205 receives this object, and holds it in the editing object storage portion 201. Then, for example, triggered by receiving this object, the source output portion 202 outputs the source of this object, and afterward editing of the source of the object becomes possible.

According to a modified example such as this, because it is not necessary for the client device 200a to be storing the object to be edited in advance, in the client device 200a it is possible at any time to edit the source or the like of an object being output in the server device 100a.

Also, integrated management of the object in the server device 100a is possible.

Also, a configuration may also be adopted in which, unlike in the above modified example, only the editing object storage portion 201 is storing the object in advance, and when for example editing the object, the object whose source will be output by the source output portion 202 is sent from a client device to a server device.

Figure 31:
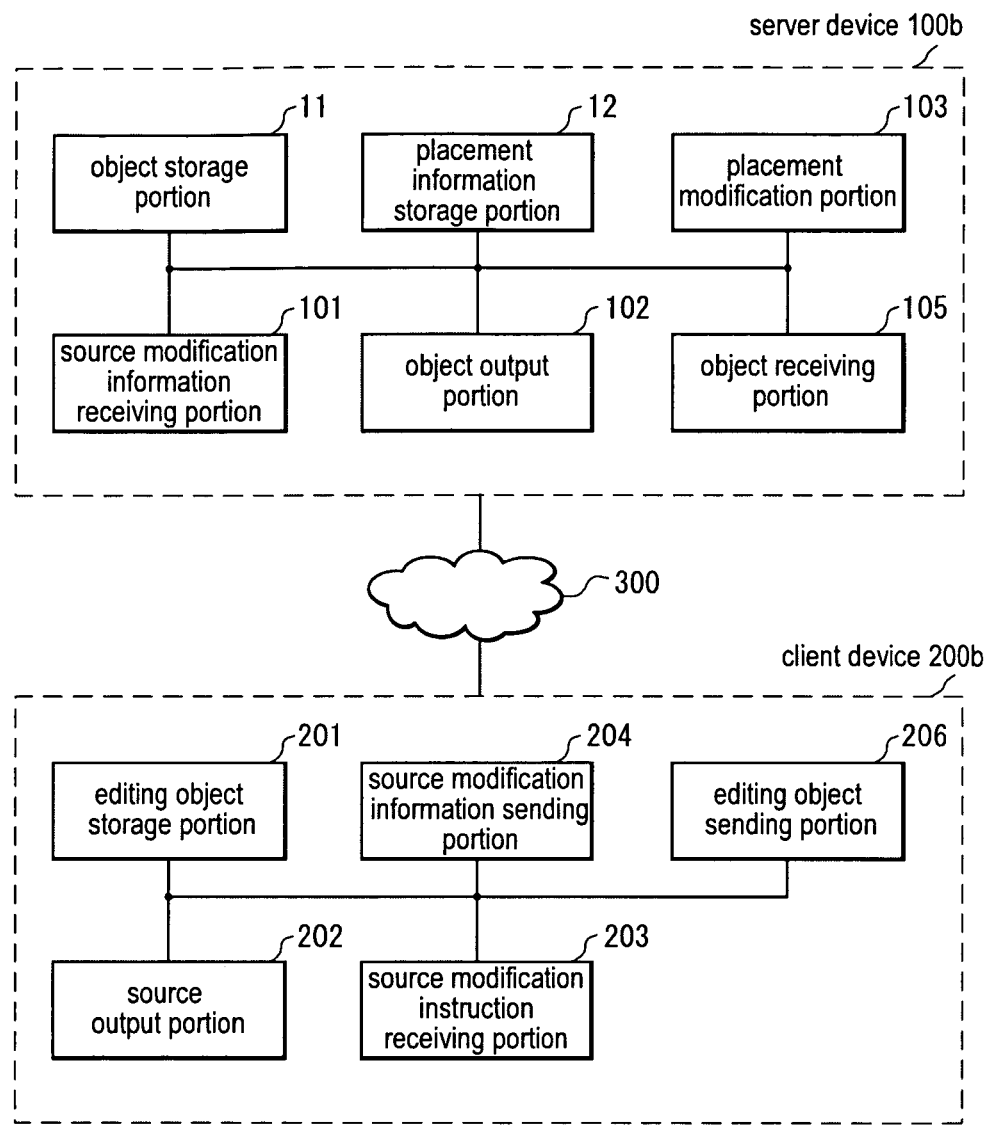
FIG. 31 shows a modified example of the information editing system in FIG. 20.

FIG. 31 shows a modified example of the information editing system of the present embodiment, provided with such a configuration for sending an object from a server device. In this modified example, in the information editing system shown in FIG. 20, rather than the server device 100 a server device 100b that further includes an object receiving portion 105 is provided, and rather than the client device 200a client device 200b that further includes an editing object sending portion 206 is provided.

The object receiving portion 105 receives an object received from the server device 100, and holds it in the editing object storage portion 201. The object receiving portion 105 is ordinarily realized with a wireless or wired communications method, but it may also be realized with a method for receiving a broadcast. Also, the processing procedure for holding the received object is ordinarily realized with software, and the software is recorded on a recording medium such as a ROM. However, the processing procedure may also be realized with hardware (a dedicated circuit). The object receiving portion 105 may be provided with, for example, an MPU, a memory, or the like for executing this processing that holds the received object.

The editing object sending portion 206 sends the object output by the source output portion 202 to the server device 100b. The editing object sending portion 206 may send the object output by the source output portion 202 after acquiring it from the editing object storage portion 201, or it may acquire and send an object read to a memory or the like from the editing object storage portion 201 when the source output portion 202 performs output. The timing or trigger with which the editing object sending portion 206 acquires and sends an object does not matter. Sending of the object whose source is output may be triggered by output of the source of the object by the source output portion 202. Also, a configuration may be adopted in which when a request to send an object has been received from the server device 100b, the object for which a request was received is sent, or a configuration may be adopted in which when a send instruction has been received from a user, the object for which a send instruction was received is sent. However, it is preferable that at least, an object is acquired and sent when the source output portion 202 starts to output the source of an object. The object sending portion 104 can be realized with a wireless or wired communications method or the like.

In this sort of configuration, for example, when an unshown receiving portion of the client device 200b receives an instruction to output the source of an object that is stored in the editing object storage portion 201 in order to edit the source of a desired object in the client device 200b, this object for which source output has been instructed is sent from the editing object sending portion 206 to the server device 100b.

In the server device 100b, the object receiving portion 105 receives this object and holds it in the object storage portion 11. Then, for example, triggered by receiving this object, it is possible for this object to be output by the object output portion 102.

According to a modified example such as this, because it is not necessary for the server device 100b to be storing in advance the object whose source will be edited, it is possible at any time in the server device 100b to output an object for which source editing in the client device 200b is desired. Thus, it is possible to reduce the time and labor of sending an object prepared in the client device 200b, for example such as an object created in the client device 200b, and it is possible to easily perform confirmation work when placing an object that is stored by the client device 200b.

Figure 32:
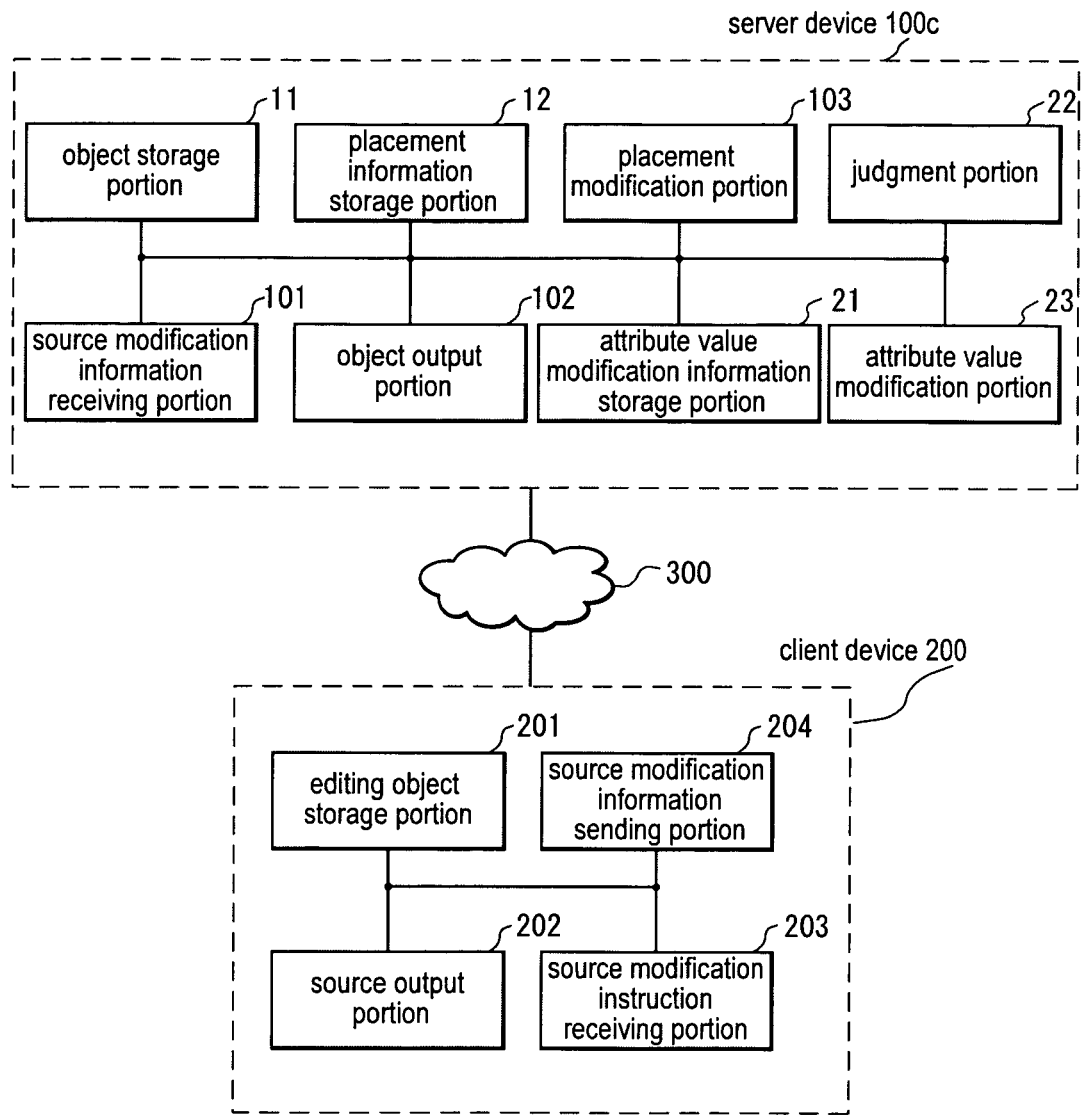
FIG. 32 shows a modified example of the information editing system in FIG. 20.

In the information editing system of the above embodiment, as shown in FIG. 32, a configuration may be adopted in which, rather than the server device 100 shown in above Embodiment 3, a server device 100c is provided that further includes an attribute value modification information storage portion 21, judgment portion 22, and attribute value modification portion 23 like that in above Embodiment 2, and like in above Embodiment 2, and when a specific keyword or the like is included in a character string object that was stored in the object storage portion 11, or a character string object that has been modified based on source modification information received in the source modification information receiving portion 101, an attribute of that character string object is modified.

Figure 33:
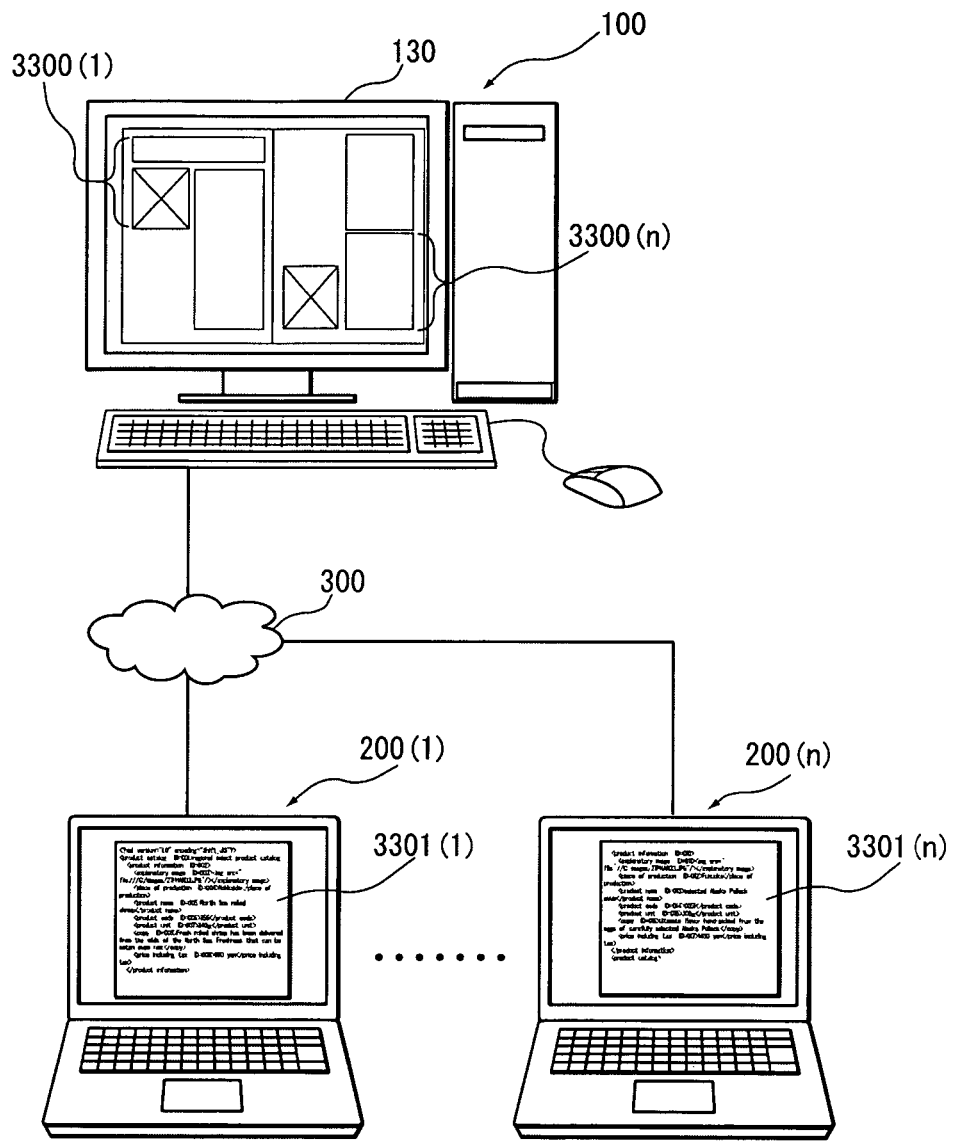
FIG. 33 is a conceptual diagram that shows a modified example of the information editing system in FIG. 20.

Also, in the present embodiment, a configuration may be adopted in which a plurality of client devices like the client device 200 are provided, and the source of objects that are different or the same, or alternatively object groups that are different or the same, is output with the respective client devices, and based on a source modification instruction, a source modification is received, and based on that source modification, the respective objects are modified in the server device 100, and object output is modified. For example, as shown in the schematic view in FIG. 33, a configuration is adopted in which two client devices 200(1) and 200(*n*) (n is an integer 2 or greater) are provided, a source 3301(*n*) of a first object group 3300(1) is displayed in the client device 200(1), a source 3301(*n*) of an n-th object group 3300(*n*) is displayed in the client group 200(*n*), and in the server device 100, a plurality of objects that includes the first object group 3300(1) and the n-th object group 3300(*n*) are output in combination or individually. A configuration may be adopted in which based on a modification of the source 3301(1) of the first object group 3300(1) by the client device 200(1), and a modification of the source 3301(*n*) of the n-th object group 3300(*n*) by the client device 200(*n*), objects are output in the server device 100 with the placement and the like of objects corresponding to the respective modifications modified. Thus, even if there are a plurality of users that use the client device 200, it is possible to perform work to edit objects at the same time.

Figure 34:
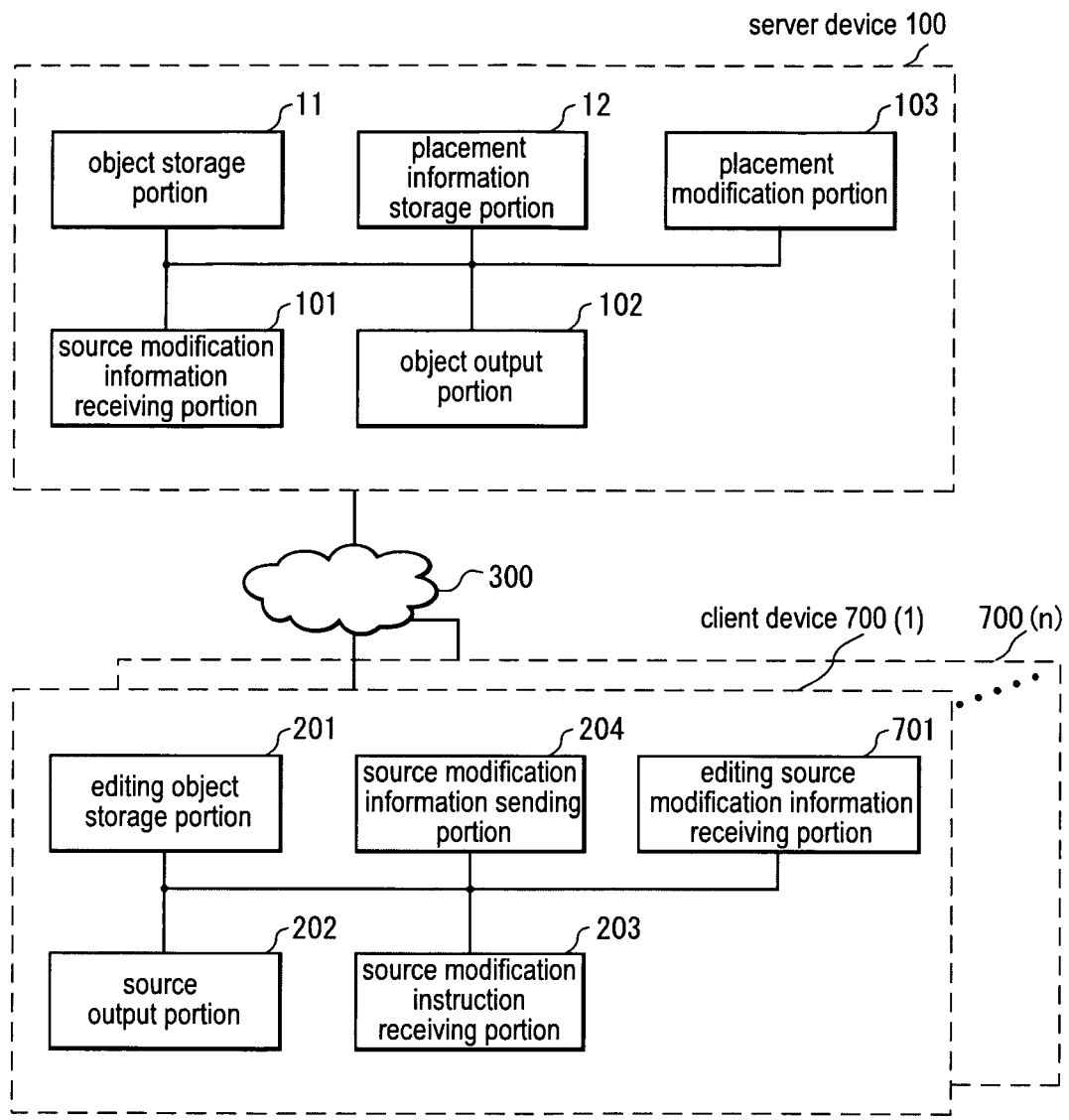
FIG. 34 shows a modified example of the information editing system in FIG. 20

Also, when it is possible that editing of the source of the same object, or alternatively the source of the same object group, will occur at the same time by a plurality of client devices, it is necessary to adopt a configuration in which editing of the source of an object by one client device is also performed for the source of the same object of another client device, and so it is preferable that the configuration of the information editing system is a configuration like that shown in FIG. 34.

In FIG. 34, the client devices 700(1) to 700(*n*)(n is an integer 2 or greater) have a configuration in which the client device 200 in above Embodiment 3 is provided with an editing source modification information receiving portion 701 that has the same configuration as the source modification information receiving portion 101 described in Embodiment 3. When one client device has received a source modifications instruction, the source modification information sending portion 204 sends source modification information that has been configured based on the source modification instruction to not only the server device 100, but also to another client device over the network 300. In the other client device, this source modification information is received in the editing source modification information receiving portion 701, and based on this received source modification information, the source output portion 202 modifies an object source, and outputs the modified object source. Thus, the same modification as the modification of an object source received in one client device is also performed for the source of an object that is being output by another client device, and it is possible for all of the client devices 700(1) to 700(*n*) to synchronize the source of the object subject to modification.

Also, in the present embodiment, a plurality of server devices like the server device 100 may be provided. In this case, when an object whose source is being modified in the client device 200 is output in the respective server devices, and further, a source modification instruction has been received in the client device 200, by sending the source modification information configured based on the source modification instruction to the respective server devices, it is possible to reflect the object source modification in the client device 200 in the object output by each server device.

The software that realizes the server device of the information editing system in each of the above embodiments is a program as described below. That is, this program is a program for allowing a computer to execute an output step of outputting, into placement areas that are set based on the placement area designation information, which is information for setting placement areas, which are two or more areas that do not overlap each other for respectively placing two or more objects that can have as data at least one of a stored character string or image, each of the objects that correspond to the respective placement areas, a source modification information receiving step of receiving source modification information for at least one of the objects being output in the object output step, which is information for modifying the source of the object, and a placement modification step of modifying the placement area of the object according to a deletion instruction or modification instruction received in the source modification information receiving step, such that the placement area is placed without overlapping.

Further, in this program, two or more of the objects are character string objects, which are objects that contain a character string, and the program further allows a computer to execute a judgment step of judging whether or not the character string of the character string object includes a predetermined keyword, and an attribute value modification step of, when the judgment step has judged that the character string of the character string object includes the predetermined keyword, modifying an attribute value of the character string object that includes the keyword, which has a predetermined corresponding relationship, to an attribute value that is set as a pair with the keyword.

Also, the software that realizes the client device of the information editing system in each of the above embodiments is a program as described below. That is, this program is a program for allowing a computer to execute a source output step of outputting the source of two or more objects that can have as data at least one of a stored character string or image, a source modification instruction receiving step of receiving a source modification instruction, which is an instruction that modifies the source of an object being output in the source output step, and a source modification information sending step of, based on the source modification instruction, configuring and sending source modification information, which is information for modifying the source of an object that is the same as at least one of the objects whose source is being output in the source output step.

Also, in each of the above embodiments, each processing (each function) may be realized by integrated processing by a single device (system), or alternatively, may be realized by distributed processing by a plurality of devices.

As described above, the information editing device and the like according to the present invention is useful as an information editing device or the like that edits information for a plurality of characters or images, and more specifically, is suitable as an information editing device or the like for information for characters or images used for publication or the like of mainly paper media such as books, magazines, and catalogs.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

The disclosure of Japanese Patent Application No. 2005-249859 filed Aug. 30, 2005 and Japanese Patent Application No. 2005-273397 filed Sep. 21, 2005 including specification, drawings and claims is incorporated herein by reference in its entirety.

What is claimed is:

1. An information editing device, comprising:
an object storage portion in which an object group that includes two or more objects each of which has as data at least one of a character string and an image is stored;
a placement information storage portion that stores frame designation information, which is information for setting two or more frames in which the objects, which have been stored in the object storage portion, are respectively placed and which correspond to the objects and do not overlap each other, the frames including first and second frames;
an object output portion that outputs the objects into corresponding frames respectively, the frames being set based on the frame designation information;
an input receiving portion that receives, for at least one of the objects output by the object output portion, a deletion instruction or a modification instruction that is an instruction that modifies the content of the object; and
a placement modification portion that, according to the deletion instruction or modification instruction received by the input receiving portion, modifies one of the frames such that the one of the frames is placed without overlapping another one of the frames, wherein
the objects are hierarchized to have two or more tree structures,
the object output portion deletes the object in the first frame when the input receiving portion receives the deletion instruction indicating to delete the object in the first frame,
the placement modification portion deletes the first frame when the object of the first frame is deleted,
the placement modification portion modifies a position of at least the second frame having an object that is, in one of the tree structures of the objects, on a level where the deleted object is on, and directly belongs, in the one of the tree structures, to an object one level above the deleted object, and replaces an area, where the deleted first frame is located, with the second frame having the object on the same level as the level where the deleted object is on, and
the placement modification portion does not modify a position of a frame having an object in a tree structure different from the one of the tree structures to which the deleted object belongs.

2. The information editing device according to claim 1, wherein
the placement modification portion replaces the area, where the deleted first frame is located, with the second frame that is positioned horizontally next to the area or vertically below the area.

3. The information editing device according to claim 1, wherein the objects are configured from a tag and data that has been associated with the tag.

4. An information editing system comprising a server device and a client device, wherein
the server device comprises:
an object storage portion in which an object group that includes two or more objects each of which has as data at least one of a character string and an image is stored;
a placement information storage portion that stores frame designation information, which is information for setting two or more frames in which the objects, which have been stored in the object storage portion, are respectively placed and which correspond to the objects and do not overlap each other, the frames including first and second frames;
an object output portion that outputs the objects into corresponding frames respectively, the frames being set based on the frame designation information;
a source modification information receiving portion that receives source modification information for at least one of the objects being output by the object output portion, which is information for modifying the source of the object; and
a placement modification portion that, according to the source modification information received by the source modification information receiving portion, modifies one of the frames such that the one of the frames is placed without overlapping another one of the frames, wherein
the objects are hierarchized to have two or more tree structures,
the object output portion deletes the object in the first frame indicated by the deletion instruction when the input receiving portion receives the deletion instruction,
the placement modification portion deletes the first frame when the object of the first frame is deleted,
the placement modification portion modifies a position of at least the second frame having an object that is, in one of the tree structures of the objects, on a level where the deleted object is on, and directly belongs, in the one of the tree structures, to an object one level above the deleted object, and replaces an area, where the deleted first frame is located, with the second frame having the object on the same level as the level where the deleted object is on, and
the placement modification portion does not modify a position of a frame having an object in a tree structure different from the one of the tree structures to which the deleted object belongs; and
the client device comprises:
an editing object storage portion in which an object that is the same as an object being output by the object output portion can be stored;
a source output portion that outputs the source of, among the objects being stored by the editing object storage portion, an object that is the same as an object being output by the object output portion;
a source modification instruction receiving portion that receives a source modification instruction, which is an instruction that modifies the source of an object that is being output by the source output portion; and
a source modification information sending portion that configures the source modification information based on the source modification instruction and sends it to the server device.

5. The information editing system according to claim 4, wherein
the server device further comprises an object sending portion that sends an object output by the object output portion to the client device, and the client device further comprises an editing object receiving portion that receives the object and holds it in the editing object storage portion.

6. The information editing system according to claim 4, wherein
the client device further comprises an editing object sending portion that sends an object whose source is output by the source output portion to the server device, and
the server device further comprises an object receiving portion that receives the object that has been sent from the editing object sending portion, and holds it in the object storage portion.

7. The information editing system according to claim 4, wherein when the source modification instruction receiving portion has received a source modification instruction, the source modification information sending portion configures and sends source modification information.

8. The information editing system according to claim 4, wherein
a plurality of the client devices are provided, and
the client devices further each comprise an editing source modification information receiving portion that receives the source modification information, and
the source modification information sending portion sends the source information to the server device and another client device, and
the source output portion, based on the source modification information received by the editing source modification information receiving portion, modifies the source of an object to be output.

9. An information editing method, comprising:
an object output step of outputting, by an object output portion, objects each of which has as data at least one of a character string and an image into corresponding frames respectively, the frames being set based on frame designation information, which is information for setting two or more of the frames in which the objects, which have been stored in an object storage portion are respectively placed and which do not overlap each other, the frames including first and second frames;
an input receiving step of receiving by an input receiving portion, for at least one of the objects output in the object output step, a deletion instruction or a modification instruction that is an instruction that modifies the content of the object; and
a placement modification step of, according to the deletion instruction or modification instruction received in the input receiving step, modifying, by a placement modification portion, one of the frames such that the one of the frames is placed without overlapping another one of the frames, wherein
the objects are hierarchized to have two or more tree structures,
the object output portion deletes the object in the first frame indicated by the deletion instruction when the input receiving portion receives the deletion instruction,
the placement modification portion deletes the first frame when the object of the first frame is deleted,
the placement modification portion modifies a position of at least the second frame having an object that is, in one of the tree structures of the objects, on a level where the deleted object is on, and directly belongs, in the one of the tree structures, to an object one level above the deleted object, and replaces an area, where the deleted first frame is located, with the second frame having the object on the same level as the level where the deleted object is on, and
the placement modification portion does not modify a position of a frame having an object in a tree structure different from the one of the tree structures to which the deleted object belongs.

10. An information editing method, comprising:
an object output step of outputting, by an object output portion, objects each of which has as data at least one of a character string and an image into corresponding frames respectively, the frames being set based on frame designation information, which is information for setting two or more of the frames in which the objects, which have been stored in an object storage portion are respectively placed and which do not overlap each other, the frames including first and second frames;
a source modification information receiving step of receiving source modification information for at least one of the objects being output in the object output step, which is information for modifying the source of the object; and
a placement modification step of, according to a deletion instruction or the modification instruction received in the source modification information receiving step, modifying, by a placement modification portion, one of the frames such that the one of the frames is placed without overlapping another one of the frames, wherein
the objects are hierarchized to have two or more tree structures,
the object output portion deletes the object in the first frame indicated by the deletion instruction when the input receiving portion receives the deletion instruction,
the placement modification portion deletes the first frame when the object of the first frame is deleted,
the placement modification portion modifies a position of at least the second frame having an object that is, in one of the tree structures of the objects, on a level where the deleted object is on, and directly belongs, in the one of the tree structures, to an object one level above the deleted object, and replaces an area, where the deleted first frame is located, with the second frame having the object on the same level as the level where the deleted object is on, and
the placement modification portion does not modify a position of a frame having an object in a tree structure different from the one of the tree structures to which the deleted object belongs.

11. A program embodied in a tangible non-transitory computer readable medium, the program configuring a computer to execute:
an object output step of outputting, by an object output portion, objects each of which has as data at least one of a character string and an image into corresponding frames respectively, the frames being set based on frame designation information, which is information for setting two or more of the frames in which the objects, which have been stored in an object storage portion are respectively placed and which do not overlap each other, the frames including first and second frames;
an input receiving step of receiving, for at least one of the objects being output in the object output step, a deletion instruction or a modification instruction that is an instruction that modifies the content of the object; and
a placement modification step of modifying, by a placement modification portion, one of the frames according to the deletion instruction or modification instruction received in the input receiving step, such that the one of the frames is placed without overlapping another one of the frames, wherein the objects are hierarchized to have two or more tree structures, the object output portion deletes the object in the first frame indicated by the deletion instruction when the input receiving portion receives the deletion instruction, the placement modification portion deletes the first frame when the object of the first frame is deleted, the placement modification portion modifies a position of at least the second frame having an object that is, in one of the tree structures of the objects, on a level where the deleted object is on, and directly belongs, in the one of the tree structures, to an object one level above the deleted object, and replaces an area, where the deleted first frame is located, with the second frame having the object on the same level as the level where the deleted object is on, and the placement modification portion does not modify a position of a frame having an object in a tree structure different from the one of the tree structures to which the deleted object belongs.

12. A program embodied in a tangible non-transitory computer readable medium, the program configuring a computer to execute:

an object output step of outputting by an object output portion, objects each of which has as data at least one of a character string and an image into corresponding frames respectively, the frames being set based on frame designation information, which is information for setting two or more of the frames in which the objects, which have been stored in an object storage portion are respectively placed and which do not overlap each other, the frames including first and second frames;

a source modification information receiving step of receiving source modification information for at least one of the objects being output in the object output step, which is information for modifying the source of the object; and a placement modification step of modifying, by a placement modification portion, one of the frames according to a deletion instruction or modification instruction received in the source modification information receiving step, such that the one of the frames is placed without overlapping another one of the frames, wherein the objects are hierarchized to have two or more tree structures, the object output portion deletes the object in the first frame indicated by the deletion instruction when the input receiving portion receives the deletion instruction, the placement modification portion deletes the first frame when the object of the first frame is deleted, the placement modification portion modifies a position of at least the second frame having an object that is, in one of the tree structures of the objects, on a level where the deleted object is on, and directly belongs, in the one of the tree structures, to an object one level above the deleted object, and replaces an area, where the deleted first frame is located, with the second frame having the object on the same level as the level where the deleted object is on, and the placement modification portion does not modify a position of a frame having an object in a tree structure different from the one of the tree structures to which the deleted object belongs.

13. The information editing device according to claim 1, wherein the object output portion deletes an object indicated by the modification instruction, and the placement modification portion modifies a size of the frame to fit the object after modification into the frame, judges whether or not the frame after the size modification overlaps another frame, and when the frame after the size modification overlaps another frame, modifies the position of the frame not to overlap another frame.

14. The information editing device according to claim 1, wherein the object output portion deletes an object indicated by the deletion instruction, and the placement modification portion that, according to the deletion instruction received by the input receiving portion, deletes a first frame of the object, selects a second frame arranged nearby the first frame in a transverse direction or a downward direction, and moves the second frame to a location where the first frame is located.

15. The information editing device according to claim 1, wherein the placement information storage portion stores rules that have been set respectively for frames in advance, the placement modification portion modifies the frame not to overlap another frame according to the rule that has been set for the frames.

16. The information editing system according to claim 4, wherein the placement modification portion of the server device replaces the area, where the deleted first frame is located, with the second frame that is positioned horizontally next to the area or vertically below the area.

17. The information editing method according to claim 9, wherein the placement modification portion replaces the area, where the deleted first frame is located, with the second frame that is positioned horizontally next to the area or vertically below the area.

18. The information editing method according to claim 10, wherein the placement modification portion replaces the area, where the deleted first frame is located, with the second frame that is positioned horizontally next to the area or vertically below the area.

19. The program embodied in the tangible non-transitory computer readable medium according to claim 11, wherein the placement modification portion replaces the area, where the deleted first frame is located, with the second frame that is positioned horizontally next to the area or vertically below the area.

20. The program embodied in the tangible non-transitory computer readable medium according to claim 12, wherein the placement modification portion replaces the area, where the deleted first frame is located, with the second frame that is positioned horizontally next to the area or vertically below the area.

* * * * *